United States Patent
Akeley et al.

(10) Patent No.: US 8,948,545 B2
(45) Date of Patent: Feb. 3, 2015

(54) COMPENSATING FOR SENSOR SATURATION AND MICROLENS MODULATION DURING LIGHT-FIELD IMAGE PROCESSING

(71) Applicant: Lytro, Inc., Mountain View, CA (US)

(72) Inventors: Kurt Barton Akeley, Saratoga, CA (US); Brian Cabral, San Jose, CA (US); Colvin Pitts, Snohomish, WA (US); Chia-Kai Liang, Mountain View, CA (US); Bennett Wilburn, Mountain View, CA (US); Timothy James Knight, Palo Alto, CA (US); Yi-Ren Ng, Palo Alto, CA (US)

(73) Assignee: Lytro, Inc., Mountain View, CA (US)

( * ) Notice: Subject to any disclaimer, the term of this patent is extended or adjusted under 35 U.S.C. 154(b) by 89 days.

(21) Appl. No.: 13/774,925

(22) Filed: Feb. 22, 2013

(65) Prior Publication Data

US 2013/0222652 A1    Aug. 29, 2013

Related U.S. Application Data

(63) Continuation-in-part of application No. 13/688,026, filed on Nov. 28, 2012, now Pat. No. 8,811,769.

(60) Provisional application No. 61/604,155, filed on Feb. 28, 2012, provisional application No. 61/604,175, filed on Feb. 28, 2012, provisional application No. 61/604,195, filed on Feb. 28, 2012, provisional application No. 61/655,790, filed on Jun. 5, 2012.

(51) Int. Cl.
| | | |
|---|---|---|
| G06K 7/00 | (2006.01) | |
| H04N 5/217 | (2011.01) | |
| H04N 9/04 | (2006.01) | |

(52) U.S. Cl.
CPC .............. *H04N 5/217* (2013.01); *H04N 9/045* (2013.01)
USPC ...................................................... 382/312

(58) Field of Classification Search
USPC .............. 382/275, 312; 348/187, 222.1, 241, 348/289, 333.02, E05.024; 359/10, 560, 359/564, 619; 345/87, 207, 690; 396/268, 396/322, 332
See application file for complete search history.

(56) References Cited

U.S. PATENT DOCUMENTS

| | | |
|---|---|---|
| 725,567 A | 4/1903 | Ives |
| 4,383,170 A | 5/1983 | Takagi et al. |

(Continued)

FOREIGN PATENT DOCUMENTS

| | | |
|---|---|---|
| DE | 19624421 | 6/1996 |
| WO | 03052465 | 6/2003 |

(Continued)

OTHER PUBLICATIONS

Adelson et al., "Single Lens Stereo with a Plenoptic Camera" IEEE Translation on Pattern Analysis and Machine Intelligence, Feb. 1992. vol. 14, No. 2, pp. 99-106.

(Continued)

*Primary Examiner* — Amir Alavi
(74) *Attorney, Agent, or Firm* — Raubvogel Law Office

(57) ABSTRACT

According to various embodiments, the system and method of the present invention process light-field image data so as to reduce color artifacts, reduce projection artifacts, and/or increase dynamic range. These techniques operate, for example, on image data affected by sensor saturation and/or microlens modulation. Flat-field images are captured and converted to modulation images, and then applied on a per-pixel basis, according to techniques described herein.

36 Claims, 21 Drawing Sheets

(56) References Cited

U.S. PATENT DOCUMENTS

| | | | |
|---|---|---|---|
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |
| 5,282,045 A | 1/1994 | Mimura et al. | |
| 5,610,390 A | 3/1997 | Miyano | |
| 5,748,371 A | 5/1998 | Cathey, Jr. et al. | |
| 5,757,423 A | 5/1998 | Tanaka et al. | |
| 5,949,433 A | 9/1999 | Klotz | |
| 6,023,523 A | 2/2000 | Cohen et al. | |
| 6,028,606 A | 2/2000 | Kolb et al. | |
| 6,097,394 A | 8/2000 | Levoy et al. | |
| 6,201,899 B1 | 3/2001 | Bergen | |
| 6,320,979 B1 | 11/2001 | Melen | |
| 6,483,535 B1 | 11/2002 | Tamburrino et al. | |
| 6,577,342 B1 | 6/2003 | Webster | |
| 6,597,859 B1 | 7/2003 | Leinhart et al. | |
| 6,842,297 B2 | 1/2005 | Dowski, Jr. et al. | |
| 6,900,841 B1 | 5/2005 | Mihara | |
| 6,927,922 B2 | 8/2005 | George et al. | |
| 7,034,866 B1 | 4/2006 | Colmenarez et al. | |
| 7,336,430 B2 | 2/2008 | George et al. | |
| 7,620,309 B2 | 11/2009 | Georgiev | |
| 7,623,726 B1 | 11/2009 | Georgiev | |
| 7,723,662 B2 | 5/2010 | Levoy et al. | |
| 7,936,392 B2 | 5/2011 | Ng et al. | |
| 7,945,653 B2 | 5/2011 | Zuckerberg et al. | |
| 7,949,252 B1 | 5/2011 | Georgiev | |
| 8,155,478 B2 | 4/2012 | Vitsnudel et al. | |
| 8,279,325 B2 | 10/2012 | Pitts et al. | |
| 8,289,440 B2 | 10/2012 | Knight et al. | |
| 8,290,358 B1 | 10/2012 | Georgiev | |
| 8,427,548 B2 * | 4/2013 | Lim et al. | 348/222.1 |
| 8,442,397 B2 * | 5/2013 | Kang et al. | 396/268 |
| 8,446,516 B2 | 5/2013 | Pitts et al. | |
| 2002/0159030 A1 | 10/2002 | Frey et al. | |
| 2003/0103670 A1 | 6/2003 | Schoelkopf et al. | |
| 2003/0117511 A1 | 6/2003 | Belz et al. | |
| 2003/0156077 A1 | 8/2003 | Balogh | |
| 2004/0114176 A1 | 6/2004 | Bodin et al. | |
| 2004/0257360 A1 | 12/2004 | Sieckmann | |
| 2005/0080602 A1 | 4/2005 | Snyder et al. | |
| 2006/0130017 A1 | 6/2006 | Cohen et al. | |
| 2007/0071316 A1 | 3/2007 | Kubo | |
| 2007/0230944 A1 | 10/2007 | Georgiev | |
| 2007/0252074 A1 | 11/2007 | Ng et al. | |
| 2008/0007626 A1 | 1/2008 | Wernersson | |
| 2008/0018668 A1 | 1/2008 | Yamauchi | |
| 2008/0131019 A1 | 6/2008 | Ng | |
| 2008/0152215 A1 | 6/2008 | Horie et al. | |
| 2008/0180792 A1 | 7/2008 | Georgiev | |
| 2008/0187305 A1 | 8/2008 | Raskar et al. | |
| 2008/0193026 A1 | 8/2008 | Horie et al. | |
| 2008/0226274 A1 | 9/2008 | Spielberg | |
| 2008/0266655 A1 | 10/2008 | Levoy et al. | |
| 2008/0277566 A1 | 11/2008 | Utagawa | |
| 2008/0309813 A1 | 12/2008 | Watanabe | |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev et al. | |
| 2009/0102956 A1 | 4/2009 | Georgiev | |
| 2009/0128658 A1 | 5/2009 | Hayasaka et al. | |
| 2009/0128669 A1 | 5/2009 | Ng et al. | |
| 2009/0140131 A1 | 6/2009 | Utagawa | |
| 2009/0185801 A1 | 7/2009 | Georgiev et al. | |
| 2009/0190022 A1 | 7/2009 | Ichimura | |
| 2009/0190024 A1 | 7/2009 | Hayasaka et al. | |
| 2009/0268970 A1 | 10/2009 | Babacan et al. | |
| 2009/0273843 A1 | 11/2009 | Raskar et al. | |
| 2009/0295829 A1 | 12/2009 | Georgiev et al. | |
| 2010/0026852 A1 | 2/2010 | Ng et al. | |
| 2010/0128145 A1 | 5/2010 | Pitts et al. | |
| 2010/0129048 A1 | 5/2010 | Pitts et al. | |
| 2010/0141802 A1 | 6/2010 | Knight et al. | |
| 2010/0277629 A1 | 11/2010 | Tanaka | |
| 2011/0129165 A1 | 6/2011 | Lim et al. | |
| 2011/0234841 A1 | 9/2011 | Akeley et al. | |
| 2012/0050562 A1 | 3/2012 | Perwass et al. | |
| 2012/0057040 A1 * | 3/2012 | Park et al. | 348/222.1 |
| 2012/0249550 A1 | 10/2012 | Akeley et al. | |
| 2012/0327222 A1 | 12/2012 | Ng et al. | |
| 2013/0033636 A1 | 2/2013 | Pitts et al. | |
| 2013/0113981 A1 | 5/2013 | Knight et al. | |
| 2013/0222606 A1 * | 8/2013 | Pitts et al. | 348/187 |
| 2013/0222633 A1 * | 8/2013 | Knight et al. | 348/222.1 |
| 2013/0222652 A1 * | 8/2013 | Akeley et al. | 348/241 |
| 2014/0085282 A1 * | 3/2014 | Luebke et al. | 345/207 |

FOREIGN PATENT DOCUMENTS

| | | |
|---|---|---|
| WO | 2006039486 | 4/2006 |
| WO | 2006129677 | 12/2006 |
| WO | 2007092545 | 8/2007 |
| WO | 2007092581 | 8/2007 |

OTHER PUBLICATIONS

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modern method of achieving high performance and/or low cost imaging systems" SPIE Proceedings, vol. 3779, Jul. 1999, pp. 137-145.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Ives, H., "Optical properties of a Lippman lenticulated sheet," J. Opt. Soc. Am. 21, 171 (1931).

Jackson et al., "Selection of a Convolution Function for Fourier Inversion Using Gridding" IEEE Transactions on Medical Imaging, Sep. 1991, vol. 10, No. 3, pp. 473-478.

Levoy, M., et al., "Light Field Microscopy," ACM Transactions on Graphics, vol. 25, No. 3, Proceedings SIGGRAPH 2006.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Lippmann, "Reversible Prints", Communication at the French Society of Physics, Journal of Physics, Mar. 20, 1908, pp. 821-825.

Lumsdaine et al., "Full Resolution Lightfield Rendering" Adobe Technical Report Jan. 2008, pp. 1-12.

Naemura et al., "3-D Computer Graphics based on Integral Photography" Optics Express, Feb. 12, 2001. vol. 8, No. 2, pp. 255-262.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Okano et al., "Three-dimensional video system based on integral photograohy" Optical Engineering, Jun. 1999, vol. 38, No. 6, pp. 1072-1077.

Sokolov, "Autostereoscopy and Integral Photography by Professor Lippmann's Method", 1911, pp. 23-29.

Tanida et al., "Thin observation module by bound optics (TOMBO): concept and experimental verification" Applied Optics 40, 11 (Apr. 10, 2001), pp. 1806-1813.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

(56) References Cited

OTHER PUBLICATIONS

Vaish et al., "Using plane + parallax for calibrating dense camera arrays", In Proceedings CVPR 2004, pp. 2-9.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Adobe Systems Incorporated, "XMP Specification", Sep. 2005.
Fitzpatrick, Brad, "Camlistore", Feb. 1, 2011.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe, "Photoshop CS6 / in depth: Digital Negative (DNG)", http://www.adobe.com/products/photoshop/extend.displayTab2html. Retrieved Jan. 2013.
Georgiev, T., et al., Plenoptic Camera 2.0 (2008).
Georgiev, T., et al., "Unified Frequency Domain Analysis of Lightfield Cameras" (2008).
Ives, Herbert, "Parallax Panoramagrams Made with a Large Diameter Lens", 1930.
Liang, Chia-Kai, et al., "Programmable Aperture Photography: Multiplexed Light Field Acquisition", ACM SIGGRAPH 2008.
Mallat, Stephane, "A Wavelet Tour of Signal Processing", Academic Press 1998.
Ogden, J., "Pyramid-Based Computer Graphics", 1985.
Snavely, Noah, et al., "Photo tourism: Exploring photo collections in 3D", ACM Transactions on Graphics (SIGGRAPH Proceedings), 2006.
Story, D., "The Future of Photography", Optics Electronics, Oct. 2008.
Sun, Jian, et al., "Stereo Matching Using Belief Propagation", 2002.
Takahashi, Keita, et al., "All in-focus View Synthesis from Under-Sampled Light Fields", ICAT 2003, Tokyo, Japan.
Williams, L., "Pyramidal Parametrics", Computer Graphics (1983).
Portable Network Graphics format: http://en.wikipedia.org/wiki/Portable_Network_Graphics. Retrieved Jan. 2013.
Exchangeable image file format: http://en.wikipedia.org/wiki/Exchangeable_image_file_format. Retrieved Jan. 2013.
Extensible Metadata Platform: http://en.wikipedia.org/wiki/Extensible_Metadata_Platform. Retrieved Jan. 2013.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
Data overlay techniques for real-time visual feed. For example, heads-up displays (http://en.wikipedia.org/wiki/Head-up_display). Retrieved Jan. 2013.
Autofocus systems and methods (http://en.wikipedia.org/wiki/Autofocus). Retrieved Jan. 2013.
Nakamura, J., "Image Sensors and Signal Processing for Digital Still Cameras" (Optical Science and Engineering), 2005.
Wenger, et al, "Performance Relighting and Reflectance Transformation with Time-Multiplexed Illumination", Institute for Creative Technologies, SIGGRAPH 2005.
Ng, R., et al., "All-Frequency Shadows Using Non-linear Wavelet Lighting Approximation. ACM Transactions on Graphics" (Proceedings of SIGGRAPH 2003).
Chen, W., et al., "Light field mapping: Efficient representation and hardware rendering of surface light fields". ACM Transactions on Graphics 21, 3, 447-456, 2002.
Debevec, P., et al., "Recovering high dynamic range radiance maps from photographs", SIGGRAPH 1997, 369-378.
Debevec, P., et al., "Acquiring the reflectance field of a human face", SIGGRAPH 2000.
Dorsey, J., et al., "Design and simulation of opera lighting and projection effects", In Computer Graphics (Proceedings of SIGGRAPH 91), vol. 25, 41-50.
Nimeroff, J., et al., "Efficient rerendering of naturally illuminated environments", in Fifth Eurographics Workshop on Rendering, 359-373, 1994.
Ramamoorthi, R., et al., "An efficient representation for irradiance environment maps", in Proceedings of SIGGRAPH 2001, 497-500.
Sloan, P., et al., "Precomputed radiance transfer for real-time rendering in dynamic, low-frequency lighting environments", ACM Transactions on Graphics 21, 3, 527-536, 2002.
Teo, P., et al., "Efficient linear rerendering for interactive lighting design", Tech. Rep. STAN-CS-TN-97-60, 1997, Stanford University.
Ng, R., et al., "Triple Product Wavelet Integrals for All-Frequency Relighting", ACM Transactions on Graphics (Proceedings of SIGGRAPH 2004).
Dorsey, J., et al., "Interactive design of complex time dependent lighting", IEEE Computer Graphics and Applications 15, 2 (Mar. 1995), 26-36.
Kautz, J., et al., "Fast arbitrary BRDF shading for low-frequency lighting using spherical harmonics", in Eurographics Rendering Workshop 2002, 291-296.
Lehtinen, J., et al., "Matrix radiance transfer", in Symposium on Interactive 3D graphics, 59-64, 2003.
Ramamoorthi, R., et al., "Frequency space environment map rendering", ACM Transactions on Graphics (SIGGRAPH 2002 proceedings) 21, 3, 517-526.
Winnemöller, H., et al., "Light Waving: Estimating Light Positions From Photographs Alone", Eurographics 2005.
Masselus, Vincent et al., "Relighting with 4D Incident Light Fields", SIGGRAPH 2003.
Fattal, Raanan et al., "Multiscale Shape and Detail Enhancement from Multi-light Image Collections", SIGGRAPH 2007.
Petschnigg, George et al., "Digital Photography with Flash and No-Flash Image Pairs", SIGGRAPH 2004.
Eisemann, Elmar et al., "Flash Photography Enhancement via Intrinsic Relighting", SIGGRAPH 2004.
Raskar, Ramesh et al., "Non-photorealistic Camera: Depth Edge Detection and Stylized Rendering using Multi-Flash Imaging", SIGGRAPH 2004.
Canon Speedlite wireless flash system: see, for example, User manual for Model 550EX. Sep. 1998.
Belhumeur, Peter et al., "The Bas-Relief Ambiguity", International Journal of Computer Vision, 1997, pp. 1060-1066.
Belhumeur, Peter et al., "The Bas-Relief Ambiguity", International Journal of Computer Vision, 1999, pp. pp. 33-44, revised version.
Wetzstein, Gordon, et al., "Sensor Saturation in Fourier Multiplexed Imaging", IEEE Conference on Computer Vision and Pattern Recognition (2010).
Nayar, Shree, et al., "Shape from Focus", IEEE Transactions on Pattern Analysis and Machine Intelligence, vol. 16, No. 8, pp. 824-831, Aug. 1994.
Levoy, Marc, "Autofocus: Phase Detection", http://graphics.stanford.edu/courses/cs178/applets/autofocusPD.html, pp. 1-3, 2010.
Sony Corporation, "Interchangeable Lens Digital Camera Handbook", 2011.

\* cited by examiner

COMPENSATING FOR SENSOR SATURATION AND MICROLENS MODULATION DURING LIGHT-FIELD IMAGE PROCESSING

CROSS-REFERENCE TO RELATED APPLICATIONS

The present application claims priority from U.S. Provisional Application Ser. No. 61/604,155 for "Compensating for Sensor Saturation and Microlens Modulation During Light-Field Image Processing", filed on Feb. 28, 2012, the disclosure of which is incorporated herein by reference in its entirety.

The present application further claims priority from U.S. Provisional Application Ser. No. 61/604,175 for "Compensating for Variation in Microlens Position During Light-Field Image Processing", filed on Feb. 28, 2012, the disclosure of which is incorporated herein by reference in its entirety.

The present application further claims priority from U.S. Provisional Application Ser. No. 61/604,195 for "Light-Field Processing and Analysis, Camera Control, and User Interfaces and Interaction on Light-Field Capture Devices", filed on Feb. 28, 2012, the disclosure of which is incorporated herein by reference in its entirety.

The present application further claims priority from U.S. Provisional Application Ser. No. 61/655,790 for "Extending Light-Field Processing to Include Extended Depth of Field and Variable Center of Perspective", filed on Jun. 5, 2012, the disclosure of which is incorporated herein by reference in its entirety.

The present application further claims priority as a continuation-in-part of U.S. Utility application Ser. No. 13/688,026 for "Extended Depth of Field and Variable Center of Perspective In Light-Field Processing", filed on Nov. 28, 2012, the disclosure of which is incorporated herein by reference in its entirety.

The present application is related to U.S. Utility application Ser. No. 11/948,901 for "Interactive Refocusing of Electronic Images," filed Nov. 30, 2007, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same," filed Feb. 10, 2010, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, the disclosure of which is incorporated herein by reference in its entirety.

The present application is related to U.S. Utility application Ser. No. 13/155,882 for "Storage and Transmission of Pictures Including Multiple Frames," filed Jun. 8, 2011, the disclosure of which is incorporated herein by reference in its entirety.

The present application is related to U.S. Utility application Ser. No. 13/664,937 for "Light-field Camera Image, File and Configuration Data, and Method of Using, Storing and Communicating Same," filed Oct. 31, 2012, the disclosure of which is incorporated herein by reference in its entirety.

The present application is related to U.S. Utility application Ser. No. 13/774,971 for "Compensating for Variation in Microlens Position During Light-Field Image Processing," filed on the same date as the present application, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices," filed on the same date as the present application, the disclosure of which is incorporated herein by reference in its entirety.

FIELD OF THE INVENTION

The present invention relates to systems and methods for processing and displaying light-field image data.

SUMMARY

According to various embodiments, the system and method of the present invention process light-field image data so as to reduce color artifacts, reduce projection artifacts, and/or increase dynamic range. These techniques operate, for example, on image data affected by sensor saturation and/or microlens modulation. Flat-field images are captured and converted to modulation images, and then applied on a per-pixel basis, according to techniques described herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DEFINITIONS

Figure 1:
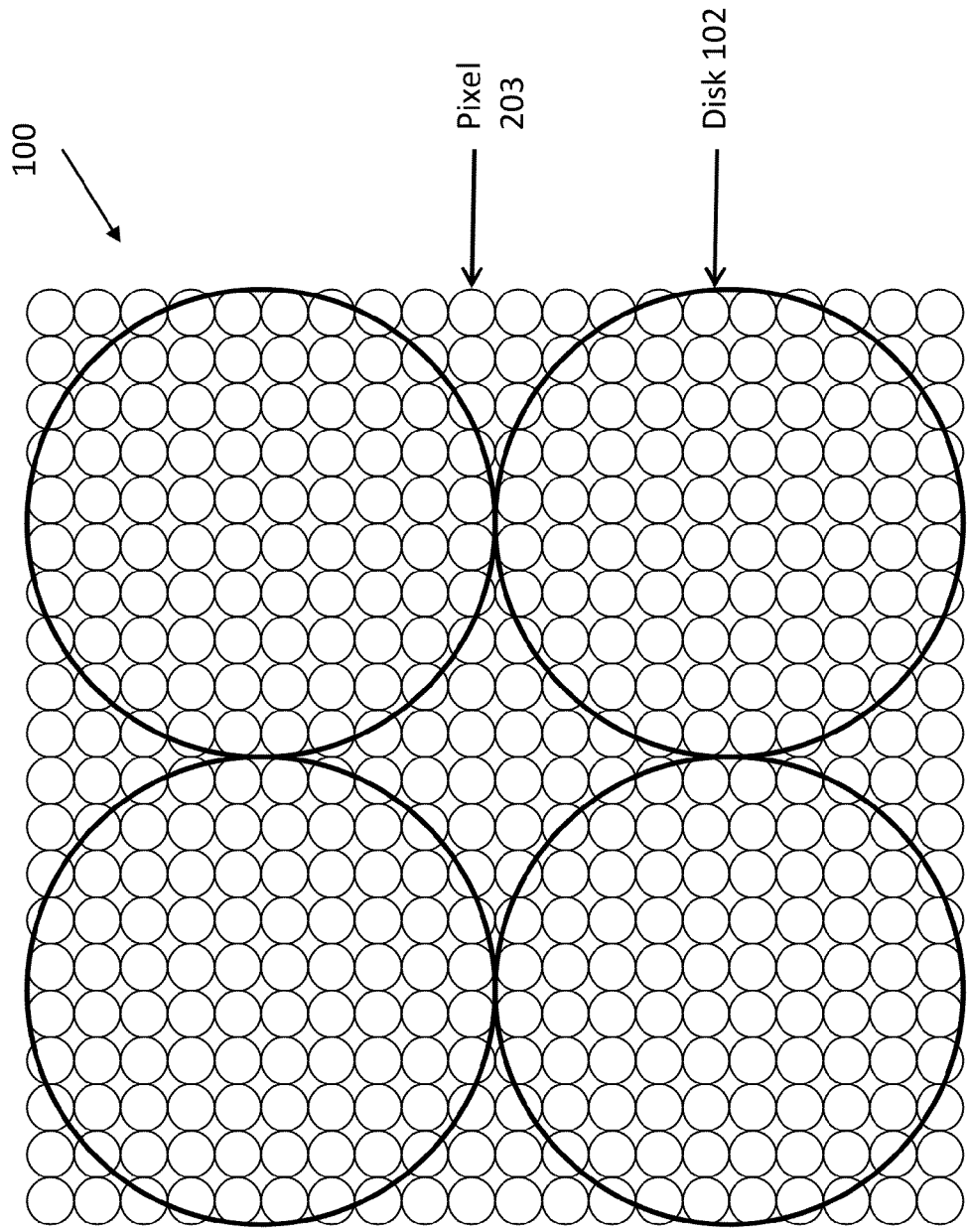
FIG. 1 depicts a portion of a light-field image.

For purposes of the description provided herein, the following definitions are used:

- aggregated irradiance: total irradiance over a period of time, e.g., on a sensor pixel while the shutter is open.
- automatic white balance (AWB): the process of computing white-balance (WB) factors and estimating color of a scene's illumination.
- Bayer pattern: a particular 2×2 pattern of different color filters above pixels on a digital sensor. The filter pattern is 50% green, 25% red and 25% blue.
- clamp: in the context of the described invention, to "clamp a signal to a value" means to select the smaller of the signal value and the clamp value.
- chrominance: a mapping of color channel values to a lower (typically n–1) space.
- demosaicing: a process of computing and assigning values for all captured color channels to each pixel, in particular when that pixel initially includes a value for only one color channel.
- disk: a region in a light-field image that is illuminated by light passing through a single microlens; may be circular or any other suitable shape.
- exposure value (EV): a measure of net sensor sensitivity resulting from ISO, shutter speed, and f-stop.
- flat-field image: a light-field image of a scene with undifferentiated rays.
- flat-field response contour: a continuous plot of the value that a hypothetical sensor pixel would take if centered at various locations on the surface of a sensor.
- image: a two-dimensional array of pixel values, or pixels, each specifying a color.
- ISO: a measure of the gain of a digital sensor.
- light-field image: an image that contains a representation of light field data captured at the sensor.
- luminance: a one-component reduction of color that corresponds to perceived brightness or intensity.
- microlens: a small lens, typically one in an array of similar microlenses.
- modulation image: an image that is computed from a flat-field image by normalizing based on average values (per color channel).
- normalized pixel value: a sensor pixel value that has been adjusted to a range where 0.0 corresponds to black (no light) and 1.0 corresponds to saturation.
- quantization: a process of approximating a continuous value with one of a fixed set of pre-determined values. Quantization error increases as the separations between pre-determined values increases.
- saturated pixel: a pixel that has been driven by aggregated irradiance to its maximum representation.
- sensor saturation: a sensor that has one or more saturated pixels
- vignetting: a phenomenon, related to modulation, in which an image's brightness or saturation is reduced at the periphery as compared to the image center.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 16A:
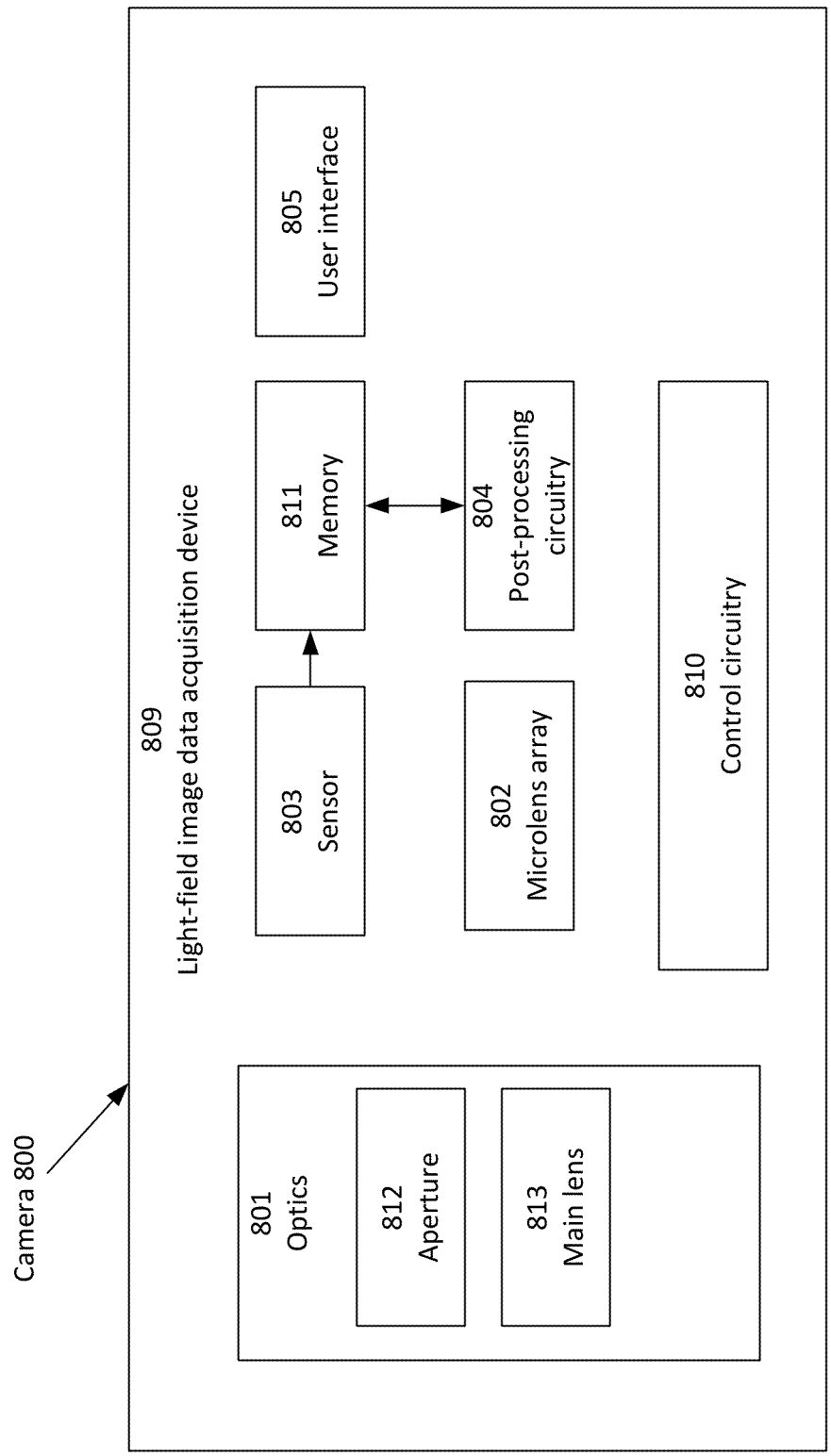
FIG. 16A depicts an example of an architecture for implementing the present invention in a light-field capture device, according to one embodiment.
Figure 16B:
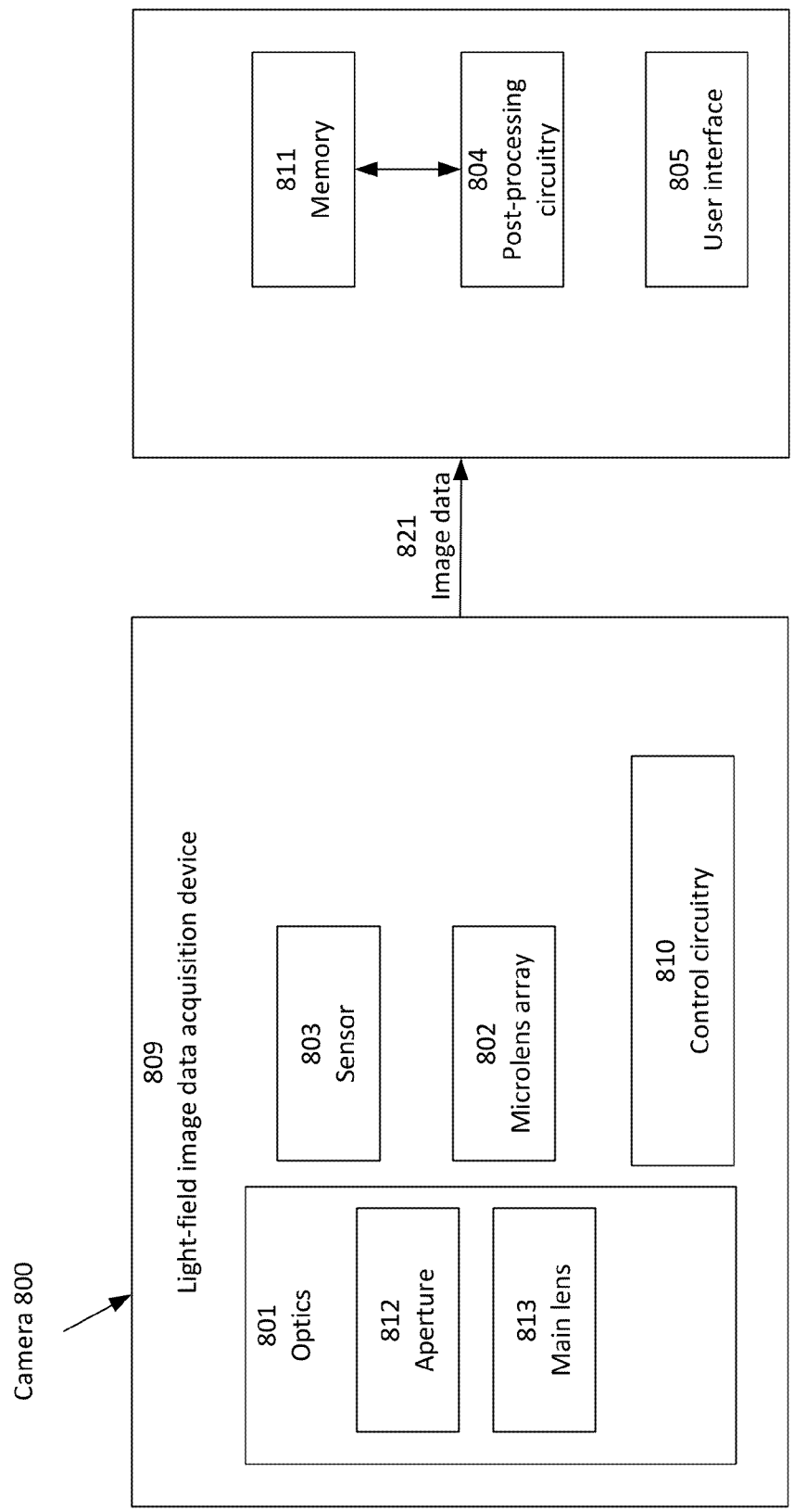
FIG. 16B depicts an example of an architecture for implementing the present invention in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 16A, there is shown a block diagram depicting an architecture for implementing the present invention in a light-field capture device such as a camera 800. Referring now also to FIG. 16B, there is shown a block diagram depicting an architecture for implementing the present invention in a post-processing system communicatively coupled to a light-field capture device such as a camera 800, according to one embodiment. One skilled in the art will recognize that the particular configurations shown in FIGS. 16A and 16B are merely exemplary, and that other architectures are possible for camera 800. One skilled in the art will further recognize that several of the components shown in the configurations of FIGS. 16A and 16B are optional, and may be omitted or reconfigured.

Figure 17:
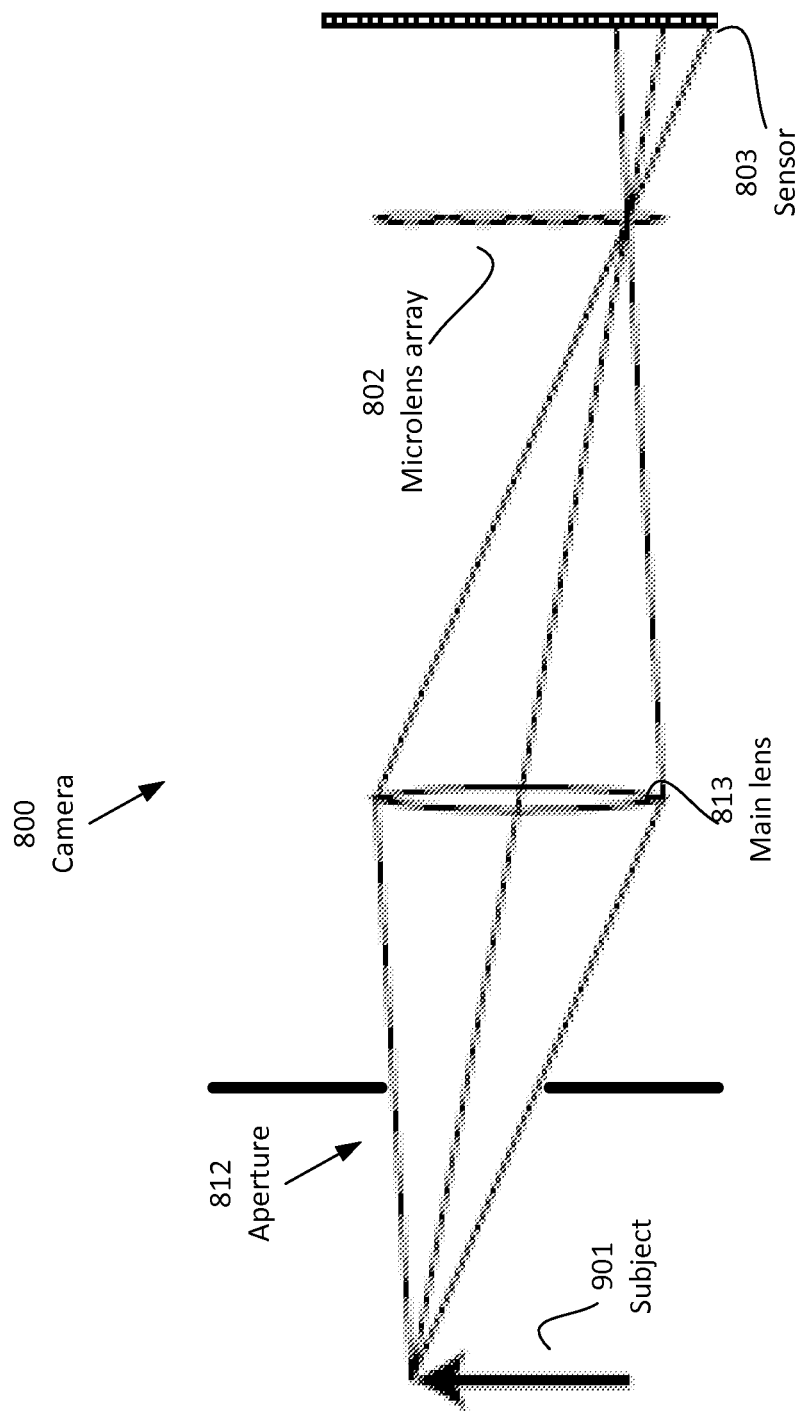
FIG. 17 depicts an example of an architecture for a light-field camera for implementing the present invention according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 17, there is shown an example of an architecture for a light-field camera 800 for implementing the present invention according to one embodiment. The Figure is not shown to scale. FIG. 17 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 16A, or it may be in a separate component external to light-field image data acquisition device 809, as shown in FIG. 16B. Such separate component may be local or remote with respect to light-field image data acquisition device 809. Any suitable wired or wireless protocol can be used for transmitting image data 821 to circuitry 804; for example camera 800 can transmit image data 821 and/or other data via the Internet, a cellular data network, a WiFi network, a BlueTooth communication protocol, and/or any other suitable means.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 203; for illustrative purposes, each disk 102 is ten pixels 203 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed on the same date as the present application, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Sensor Saturation

As described above, digital sensor 803 in light-field image data acquisition device 809 may capture an image as a two-dimensional array of pixel values. Each pixel 203 may report its value as an n-bit integer, corresponding to the aggregated irradiance incident on that pixel 203 during its exposure to light. Typical pixel representations are 8, 10, or 12 bits per pixel, corresponding to 256, 1024, or 4096 equally spaced aggregated irradiances. In some devices 809, the sensitivity of sensor 803 may be adjusted, but, in general, such adjustment affects all pixels 203 equally. Thus, for a given sensitivity, sensor 803 may capture images whose aggregated irradiances vary between zero and the aggregated irradiance that drives a pixel 203 to its maximum integer representation. Aggregated irradiances greater than this value may also drive the pixel 203 upon which they are incident to its maximum representation, so these irradiances may not be distinguishable in subsequent processing of the captured image. Such a pixel 203 is referred to herein as being saturated. Sensor saturation refers to a condition in which sensor 803 has one or more saturated pixels 203.

It is well known to provide capability, within an image capture device such as a digital camera, to adjust the sensitivity (ISO value) of digital sensor 803, the duration of its exposure to light captured by main lens 813 (shutter speed), and/or the size of aperture 812 (f-stop) to best capture the information in the scene. The net sensitivity resulting from ISO, shutter speed, and f-stop is referred to as exposure value, or EV. If EV is too low, information may be lost due to quantization, because the range of aggregated irradiances uses only a small portion of the available pixel representations. If EV is too high, information may be lost due to saturation, because pixels 203 with high aggregated irradiances have values that are indistinguishable from one another. While an EV that avoids sensor saturation is appropriate for some images, many images are best sampled with an EV that results in some saturated pixels 203. For example, a scene for which most aggregated pixel irradiances fall in a small range, but a few pixels 203 experience much greater aggregated irradiances, is best sampled with an EV that allows the high-aggregated-irradiance pixels 203 to be saturated. If EV were adjusted such that no pixel 203 saturated, the scene would be highly quantized. Thus, in some lighting conditions, sensor saturation may not be avoided without significant compromise.

As described above, digital sensors 803 may represent pixel values with differing numbers of bits. Pixel values may be normalized such that integer value zero corresponds to real value 0.0, and integer value $2^n-1$ (the maximum pixel value for a pixel represented with n bits) corresponds to real value 1.0. For purposes of the description provided herein, other factors such as black-level offset, noise other than that due to quantization, and pixels that do not operate correctly may be ignored.

Bayer Pattern

Ideally a digital sensor 803 would capture full chromatic information describing the aggregated irradiance at each pixel 203. In practice, however, each pixel 203 often captures a single value indicating the aggregate irradiance across a specific range of spectral frequencies. This range may be determined, for example, by a spectral filter on the surface of digital sensor 803, which restricts the range of light frequencies that is passed through to the pixel sensor mechanism. Because humans may distinguish only three ranges of spectra, in at least one embodiment, sensor 803 is configured so that each pixel 203 has one of three spectral filters, thus capturing information corresponding to three spectral ranges. These filters may be arranged in a regular pattern on the surface of digital sensor 803.

Figure 2:
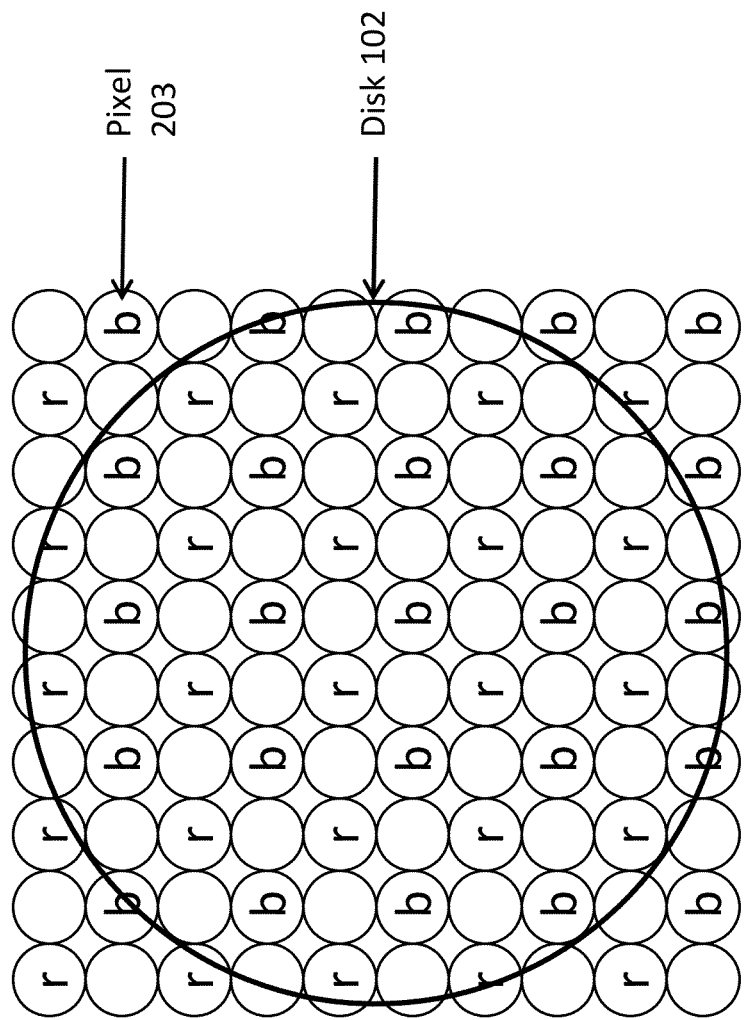
FIG. 2 depicts an example of a Bayer pattern.

Referring now to FIG. 2, there is shown one possible arrangement of filters for pixels 203, referred to as a Bayer pattern. FIG. 2 depicts a number of pixels 203 associated with a single disk 102, configured in a Bayer pattern. Pixels 203 sensitive to low spectral frequencies are marked "r", corresponding to the perceived color red. Pixels 203 sensitive to high spectral frequencies are marked "b", corresponding to the perceived color blue. The remaining (unmarked) pixels 203 are sensitive to mid-spectral frequencies, corresponding to the perceived color green. For purposes of the description herein, these spectral ranges are referred to as color channels.

In alternative embodiments, other color filters can be represented, such as those that include additional primary colors. In various embodiments, the system of the present invention can also be used in connection with multi-spectral systems.

In alternative embodiments, the filters can be integrated into microlens array 802 itself.

Modulation

Figure 3:
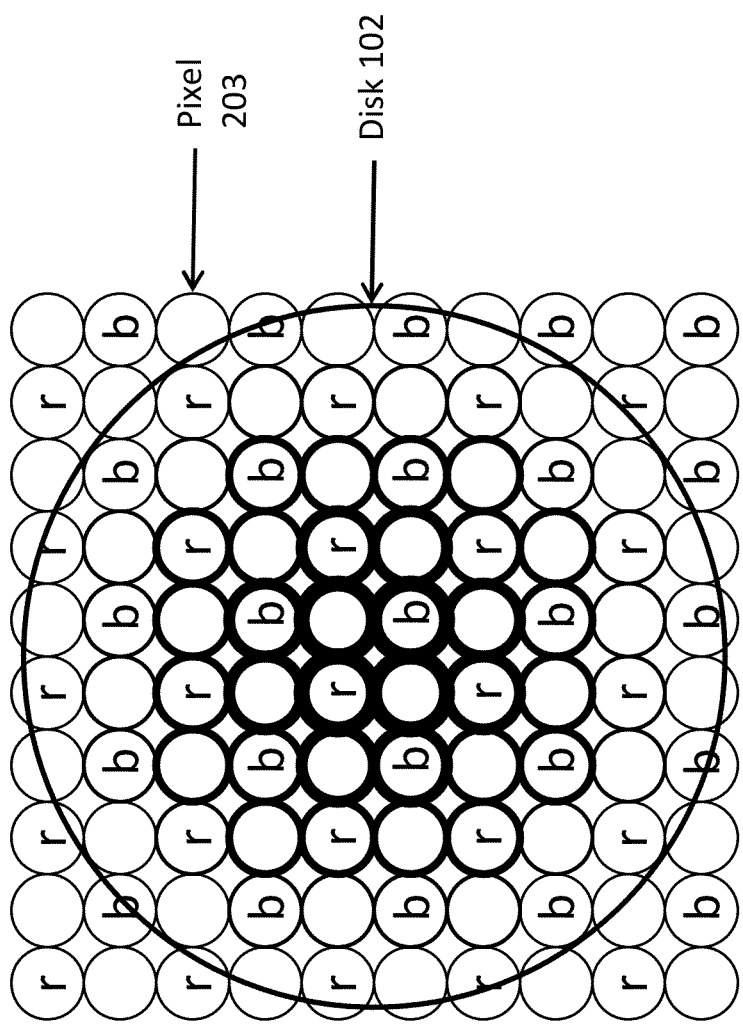
FIG. 3 depicts an example of flat-field modulation, shown as a distribution of irradiances of pixels within a single disk illuminated by a scene with uniform radiance.

Pixels 203 within a disk 102 may not experience equal irradiance, even when the scene being imaged has uniform radiance (i.e., radiance that is the same in all directions and at all spatial locations). For example, pixels 203 located near the center of a disk 102 may experience greater irradiance, and pixels near or at the edge of the disk 102 may experience lower irradiance. In some situations, the ratio of the greatest pixel irradiance to the lowest pixel irradiance may be large, for example, 100:1. Referring now to FIG. 3, there is shown an example of a distribution of irradiances of pixels 203 within a single disk 102 projected by a microlens in microlens array 802, illuminated by a scene with uniform radiance. In this Figure, irradiance is represented by the thickness of each pixel's 203 circular representation: thick circles in the center denoting pixels 203 with high irradiance, and increasingly thin circles toward the edge of disk 102 denoting pixels 203 with reduced irradiance. This distribution of irradiances for a scene with uniform radiance is referred to as a "flat-field modulation".

Vignetting is a related phenomenon, in which an image's brightness or saturation is reduced at the periphery as compared to the image center.

Figure 4:
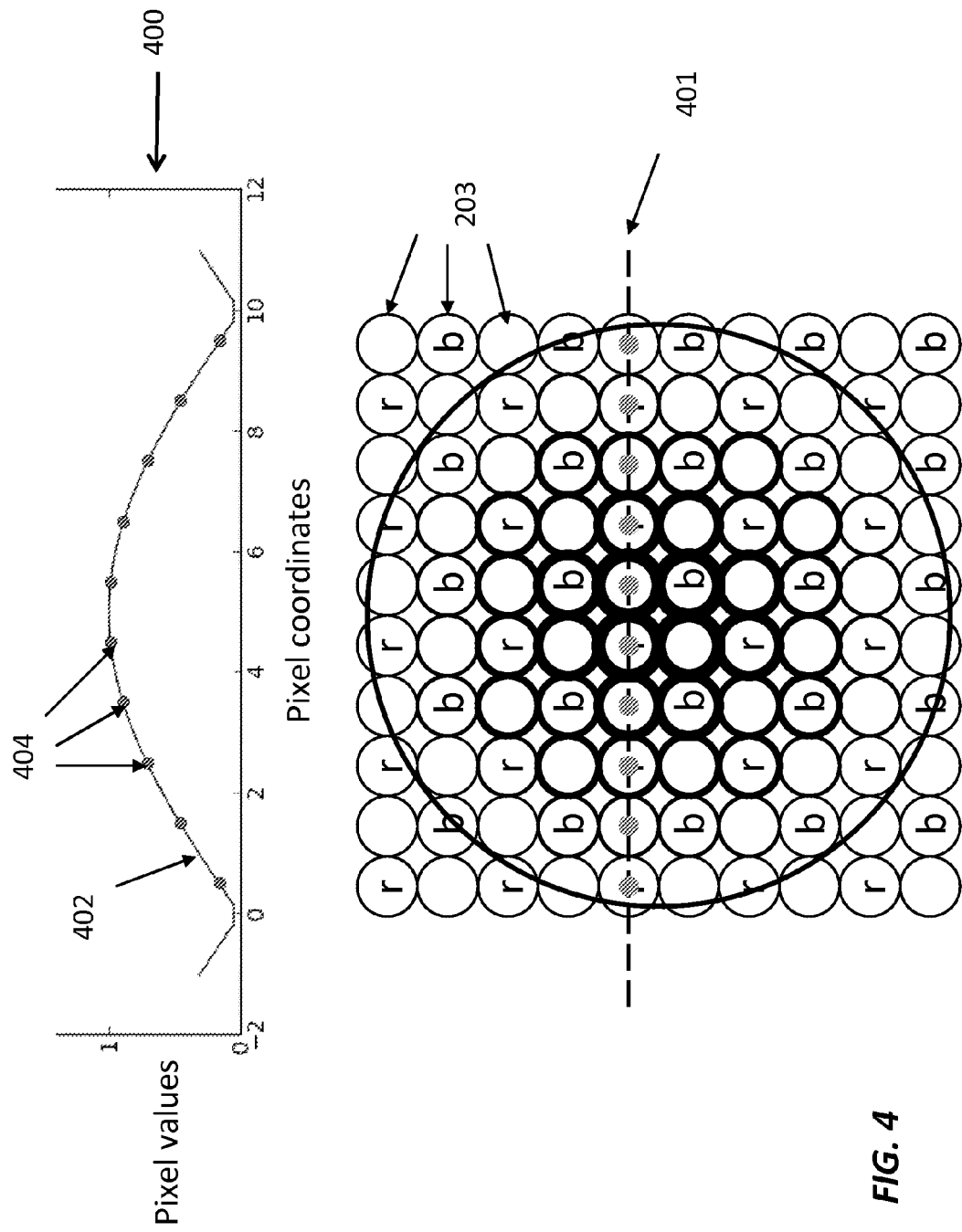
FIG. 4 is a graph depicting an example of a flat-field response contour based on the flat-field modulation depicted in FIG. 3.

As depicted in FIG. 3, microlens modulation is a two-dimensional phenomenon. For illustrative and analytical purposes, however, it can be useful to consider a one-dimensional contour displaying the effect of modulation. Referring now to FIG. 4, there is shown a graph 400 depicting an example of a flat-field response contour 402 based on the flat-field modulation depicted in FIG. 3.

In graph 400, ten discrete values 404 are plotted, corresponding to normalized pixel values along a contour segment 401 drawn horizontally through the (approximate) center of disk 102. Although these ten values 404 are discrete, a continuous flat-field contour 402 is also plotted. Contour 402 describes the values pixels 203 would have if their centers were located at each position along the x-axis.

Figure 5:
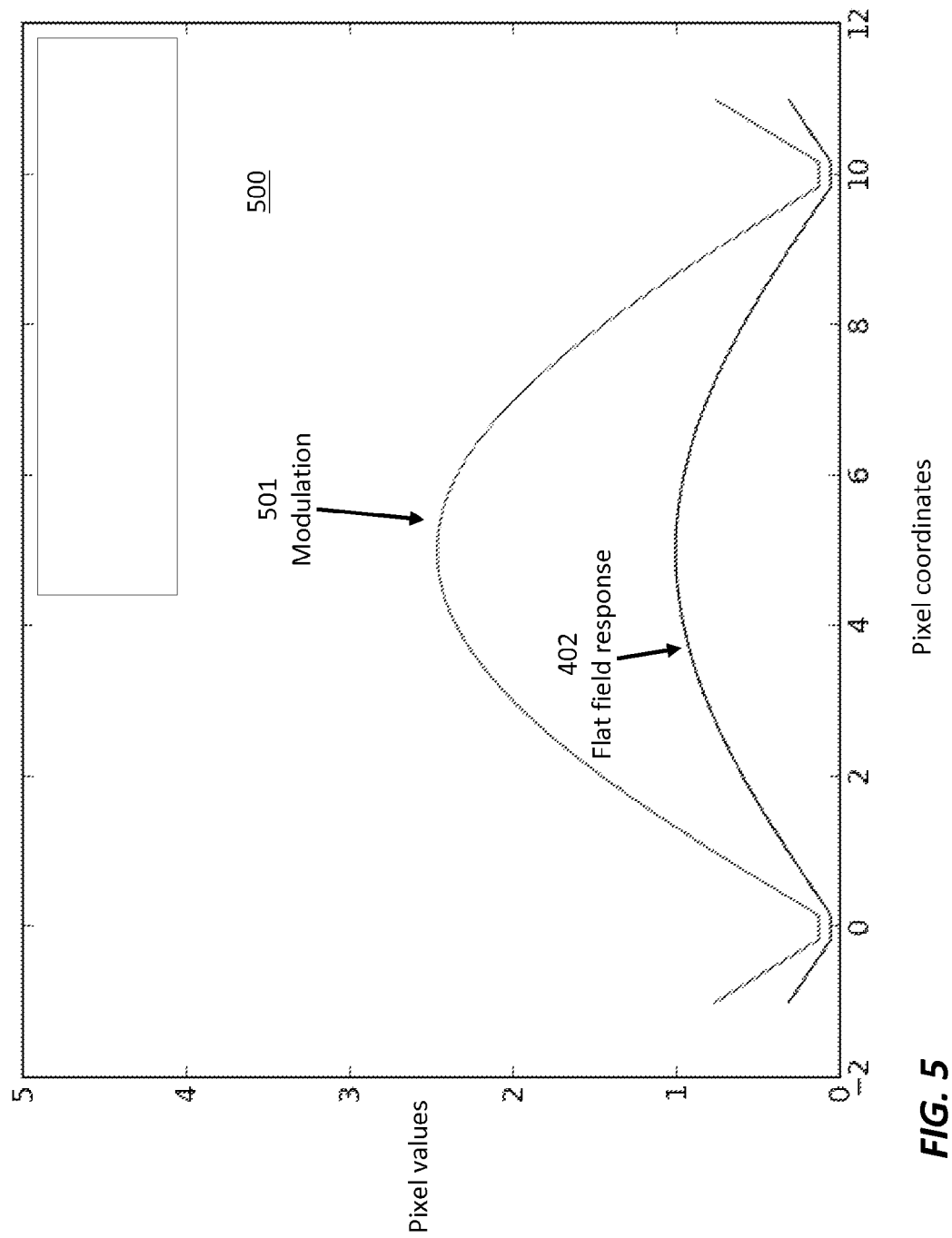
FIG. 5 is a graph depicting an example of a modulation contour corresponding to the flat-field response contour depicted in FIG. 4.

It may be a good approximation to predict that all of the light that is incident on microlens array 802 also reaches digital sensor 803—assuming that microlens array 802 may refract light, but does not occlude light. Referring now to FIG. 5, there is shown a graph 500 depicting an example of a modulation contour 501 corresponding to the flat-field response contour 402 depicted in FIG. 4. Modulation contour 501 is computed by scaling flat-field response contour 402 such that its average value is 1.0. To be physically accurate, the average flat-field value may be computed over the two-dimensional disk area, rather than the one-dimensional contour. Thus computed, modulation contour 501 is a physically accurate scale factor that specifies the ratio of actual irradiance at a pixel 203, to the irradiance that the pixel 203 would receive if the same total irradiance were equally distributed across the pixels 203 on the sensor's 803 surface.

A modulation image, having pixel values that are the modulation values corresponding to each pixel 203 in a light-field image, may be computed by imaging a scene with uniform radiance. To ensure numerically accurate results, EV and scene radiance may be adjusted so that pixels with maximum irradiance have normalized values near 0.5. Such a light-field image is referred to herein as a flat-field image. The average pixel value of this flat-field image may be computed. The modulation value for each pixel in the modulation image may then be computed as the value of the corresponding pixel in the flat-field image, divided by the average pixel value of the flat-field image.

Bayer Consequences

As described above, digital sensor 803 may include pixels 203 with different spectral filters, which are sensitive to different ranges of visible spectra. These pixels 203 may be arranged in a regular pattern, such as the Bayer pattern described above in connection with FIG. 2. In one embodiment, modulation values for pixels 203 of different spectral sensitivities may be computed separately. For example, if each pixel 203 has one of three spectral sensitivities—red, green, or blue—then modulation values may be computed separately for all the red pixels 203, for all the green pixels 203, and for all the blue pixels 203. For each calculation, the average flat-field value of all the pixels 203 in the group is computed, and then each pixel's 203 modulation value is computed as its flat-field value divided by the average flat-field value.

Sampling and Interpolation

Modulation may differ as a function of several parameters of light-field camera 800. For example, modulation may differ as the focal length and focus distance of main lens 813 are changed, and as the exposure duration of a mechanical shutter is changed. In some embodiments, it may be impractical to compute and retain a modulation image for each possible combination of such parameters.

For example, there may be n camera parameters that affect modulation. These n parameters may be thought of as defining an n-dimensional space. This space may be sampled at points (n-tuples) that are distributed throughout the space. Each sample may be taken by 1) setting camera parameters to the values specified by the sample coordinates, and 2) capturing a flat-field image. All camera parameters other than the n parameters, and all consequential external variables (for example, the scene radiance) may retain the same values during the entire sampling operation. The sample locations may be selected so that there is minimal difference between the values in corresponding pixels 203 of flat-field images that are adjacent in the n-dimensional space. Under these circumstances, the flat-field image for a point in the n-dimensional space for which no sample was computed may be computed by interpolating or extrapolating from samples in the n-dimensional space. Such an interpolation or extrapolation may be computed separately for each pixel 203 in the flat-field image. After the flat-field image for the desired coordinate in the n-dimensional space has been computed, the modulation image for this coordinate may be computed from the flat-field image as described above.

Storage

Flat-field images may be captured during the manufacture and calibration of camera 800, or at any time thereafter. They may be stored by any digital means, including as files in custom formats or any standard digital-image format, or in a data base (not shown). Data storage size may be reduced using compression, either lossless (sufficient for an exact reconstruction of the original data) or lossy (sufficient for a close but not exact reconstruction of the original data.) Flat-field data may be stored locally or remotely. Examples of such storage locations include, without limitation: on camera 800; in a personal computer, mobile device, or any other personal computation appliance; in Internet storage; in a data archive; or at any other suitable location.

Demodulation

It may be useful to eliminate the effects of modulation on a light-field image before processing the pixels 203 in that image. For example, it may be useful to compute a ratio between the values of two pixels 203 that are near each other. Such a ratio is meaningless if the pixels 203 are modulated differently from one another, but it becomes meaningful after the effects of modulation are eliminated. The process of removing the effects of modulation on a light-field image is referred to herein as a demodulation process, or as demodulation.

According to various embodiments of the present invention, flat-field images are captured and converted to modulation images, then applied on a per-pixel basis, according to techniques described herein.

The techniques described herein can be used to correct the effects of vignetting and/or modulation due to microlens arrays 802.

Each pixel in a modulation image describes the effect of modulation on a pixel in a light-field image as a simple factor m, where $$p_{mod} = m p_{ideal}$$

To eliminate the effect of modulation, $p_{mod}$ can be scaled by the reciprocal of m:

$$p_{demod} = \frac{1}{m} p_{mod} \cong p_{ideal}$$

Figure 6:
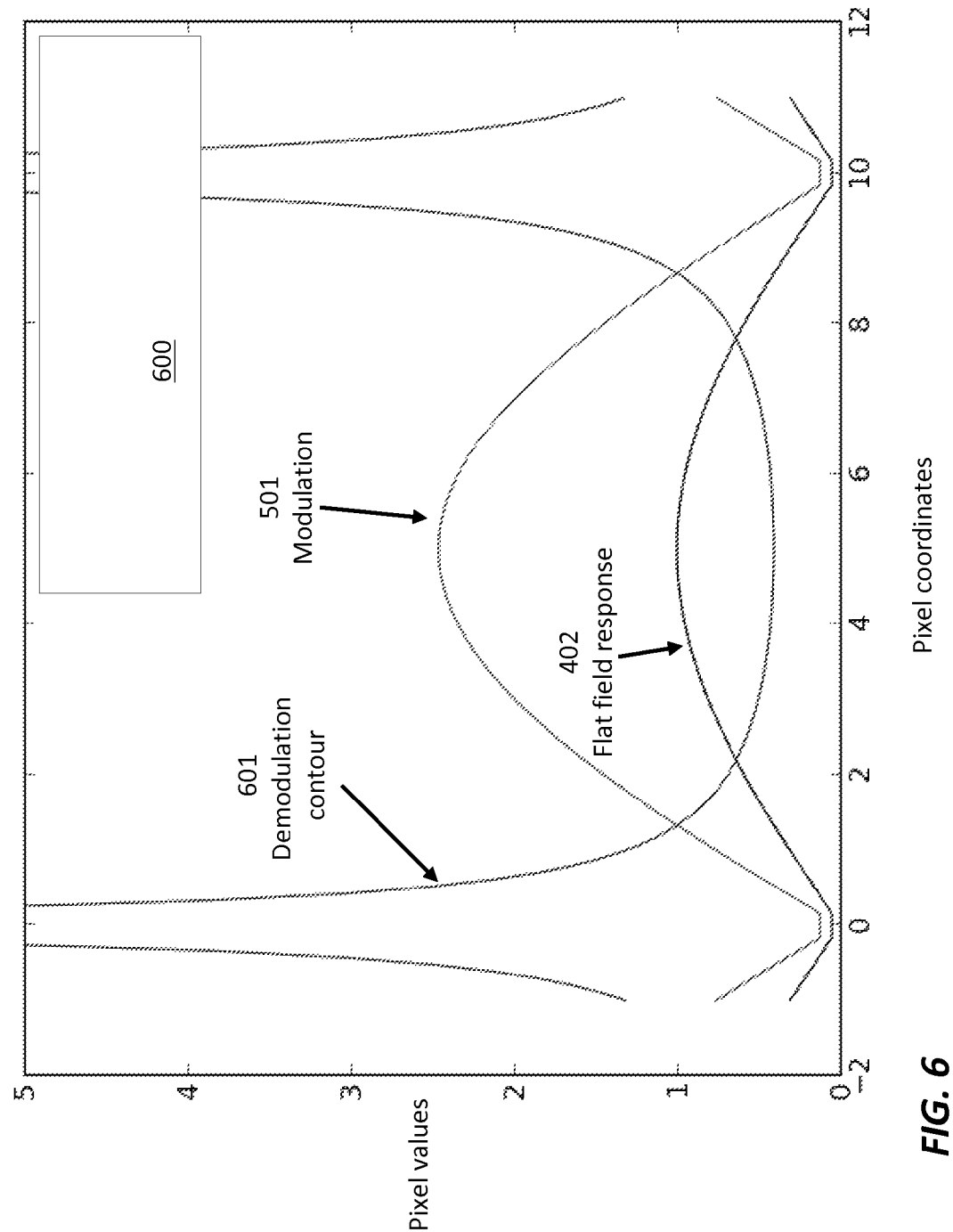
FIG. 6 is a graph depicting an example of a demodulation contour for the modulation contour depicted in FIG. 5.

Using this relationship, a demodulation image is computed as an image with the same dimensions as its corresponding modulation image, wherein each pixel has a value equal to the reciprocal of the value of the corresponding pixel in the modulation image. A light-field image is demodulated by multiplying it, pixel by pixel, with the demodulation image. Pixels in the resulting image have values that nearly approximate the values in an ideal (unmodulated) light-field image. Referring now to FIG. 6, there is shown an example of a demodulation contour 601 for the modulation contour 501 depicted in FIG. 5. A demodulation image corresponding to this demodulation contour 601 can be generated by taking the reciprocal of the pixel value at each point in the modulation image corresponding to modulation contour 501.

In some cases, noise sources other than quantization may cause a pixel 203 whose aggregate illumination is very low (such as a highly modulated pixel 203) to have a negative value. In at least one embodiment, when performing demodulation, the system of the present invention clamps pixels in the computed modulation image to a very small positive value, so as to ensure that pixels in the demodulation image (the reciprocals of the modulation values) are never negative, and in fact never exceed a chosen maximum value (the reciprocal of the clamp value).

Demodulation can be used to correct for any type of optical modulation effect, and is not restricted to correcting for the effects of modulation resulting from the use of disks. For example, the techniques described herein can be used to correct modulation due to main-lens vignetting, and/or to correct modulation due to imperfections in microlens shape and position.

Demodulation can be performed at any suitable point (or points) in the image processing path of digital camera 800 or other image processing equipment. In some cases, such as when using a light field digital camera 800, existing hardware-accelerated operations (such as demosaicing) may operate more effectively if demodulation is performed earlier along the image processing path.

Demosaicing

In at least one embodiment, pixels 203 in the demodulated image may have single values, each corresponding to one of three spectral ranges: red, green, or blue. The red, green, and blue pixels may be arranged in a mosaic pattern, such as the Bayer pattern depicted in FIG. 2. Before further processing is done, it may be useful for each pixel 203 to have three values—red, green, and blue—so that it specifies the spectral intensity of incident light as completely as is possible in a tri-valued imaging system. The process of estimating and assigning the two unknown values at each pixel location is referred to as demosaicing.

In other embodiments, any number of spectral ranges can be used; thus, the above example (in which three spectral ranges are used) is merely exemplary.

One demosaicing approach is to estimate unknown pixel values from known values that are spatially near the known value in the image. For these estimations to give meaningful results, the values they operate on must be commensurate, meaning that their proportions are meaningful. However, pixel values in a modulated image are not commensurate—their proportions are not meaningful, because they have been scaled by different values. Thus demosaicing a modulated image (specifically, demosaicing a light-field image that has not been demodulated) may give unreliable results.

Because modulation in a light field camera can have higher amplitude and frequency (i.e. pixel modulation varies more dramatically than in a conventional camera), it can have a more significant effect on demosaicing than does vignetting in a conventional camera. Accordingly, the techniques of the present invention are particularly effective in connection with demosaicing efforts for light-field cameras.

Estimation of the Color of Scene Illumination

The three color-channel values of a demosaiced pixel may be understood to specify two distinct properties: chrominance and luminance. In general, chrominance is a mapping from n-valued to (n−1)-valued tuples, while luminance is a mapping from n-valued tuples to single values. More particularly, where three color channel values are available, chrominance is a two-value mapping of the three color channel values into the perceptual properties of hue (chrominance angle) and saturation (chrominance magnitude); luminance is a single-valued reduction of the three pixel values. Perceptual properties such as apparent brightness are specified by this value. For example, luminance may be computed as a weighted sum of the red, green, and blue values. The weights may be, for example, 0.2126 (for red), 0.7152 (for green), and 0.0722 (for blue).

Many algorithms that map and reduce a three-channel RGB signal to separate chrominance and luminance signals are known in the art. For example, chrominance may be specified as the ratios of the RGB channels to one another. These ratios may be computed using any of the values as a base. For example, the ratios r/g and b/g may be used. Regardless of which value is used as the base, exactly (n−1) values (i.e. two values, if there are three color channel values) are required to completely specify pixel chrominance with such a representation.

The illumination in a scene may be approximated as having a single chrominance (ratio of spectral components) that varies in amplitude throughout the scene. For example, illumination that appears red has a higher ratio of low-frequency spectral components to mid- and high-frequency spectral components. Scaling all components equally changes the luminance of the illumination without changing the ratios of its spectral components (its color channels).

The apparent chrominance or color constancy of an object in a scene is determined by the interaction of the surface of the object with the light illuminating it. In a digital imaging system, the chrominance of scene illumination may be estimated from the apparent chrominance of objects in the scene, if the light-scattering properties of some objects in the scene are known or can be approximated. Algorithms that make such approximations and estimations are known in the art as Automatic White Balance (AWB) algorithms.

While the colors in a captured image may be correct, in the sense that they accurately represent the colors of light captured by the camera, in some cases an image having these colors may not look correct to an observer. Human observers maintain color constancy, which adjusts the appearance of colors based on the color of the illumination in the environment and relative spatial location of one patch of color to another. When a picture is viewed by a human observer in an environment with different illumination than was present when the picture was captured, the observer maintains the color constancy of the viewing conditions by adjusting the colors in the image using the color of the illumination of the viewing environment, instead of the illumination of the scene captured in the picture. As a result, the viewer may perceive the colors in the captured picture to be unnatural.

To avoid the perception of unnatural colors in captured images, AWB algorithms may compute white-balance factors, in addition to their estimate of illuminant color. For example, one factor can be used for each of red, green, and blue, although other arrangements such as 3×3 matrices are also possible. Such factors are used to white-balance the image by scaling each pixel's red, green, and blue components. White-balance factors may be computed such that achromatic objects in the scene (i.e., objects that reflect all visible light frequencies with equal efficiency) appear achromatic, or gray, in the final picture. In this case, the white-balance factors may be computed as the reciprocals of the red, green, and blue components of the estimated color of the scene illuminant. These factors may all be scaled by a single factor such that their application to a color component changes only its chrominance, leaving luminance unchanged. It may be more visually pleasing, however, to compute white-balance factors that push gray objects nearer to achromaticity, without actually reaching that goal. For example, a scene captured at sunset may look more natural with some yellow remaining, rather than being compensated such that gray objects become fully achromatic.

Because AWB algorithms operate on colors, and because colors may be reliably available from sensor image data only after those data have been demosaiced, it may be advantageous, in some embodiments, to perform AWB computation on demosaiced image data. Any suitable methodology for sampling the Bayer pattern may be used. In particular, the sampling used for AWB statistical analysis need not be of the same type as is used for demosaicing. It may further be advantageous, in some embodiments, for the AWB algorithm to sample the demosaiced image data only at, or near, disk centers. In some situations, sampling the demosaiced image in highly modulated locations, such as near the edges of disks, may result in less reliable AWB operation, due, for example, to greater quantization noise.

Figures 18A, 18B:
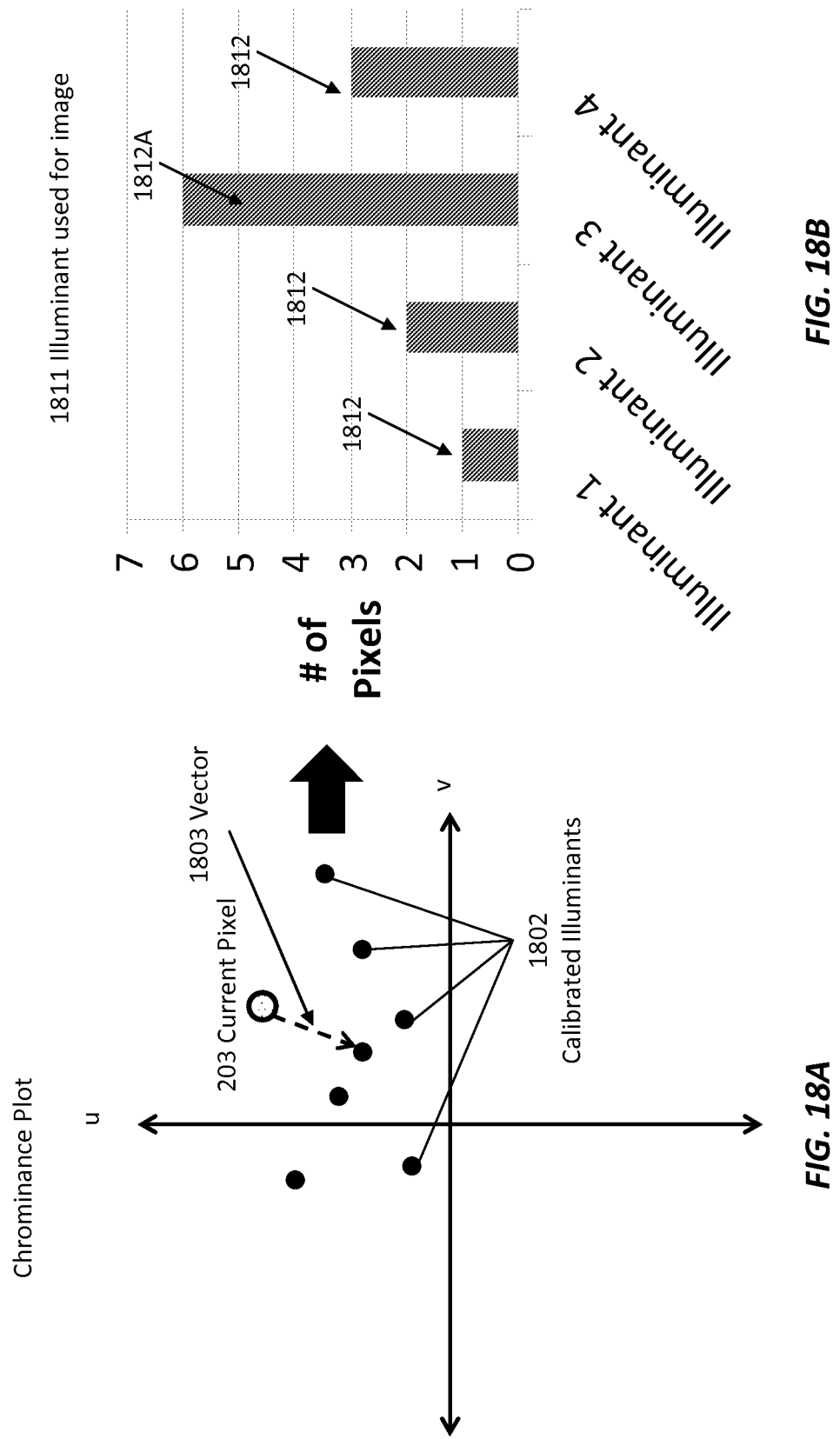
FIGS. 18A and 18B depict an example of a method for selecting an illuminant for a scene and its corresponding white balance factors, according to one embodiment.

Referring now to FIGS. 18A and 18B, there is shown an example of a method for selecting an illuminant for a scene and its corresponding white balance factors, according to one embodiment. Camera 800 is calibrated with a variety of known illuminants, and the chrominance of each illuminant is stored. When a light field image is captured, the demosaiced chrominance value is calculated for each pixel 203. The chrominance of each pixel 203 is plotted in Cartesian space, where each axis represents one of the two chrominance variables. In this chrominance space, a vector is calculated between each pixel's 203 chrominance and the known chrominance of the calibrated illuminants 1802. The illuminant associated with the smallest vector length 1803 is then selected and stored. This is performed for every non-saturated pixel 203. As described below, saturated pixels have corrupted chrominance values. A histogram 1811 indicating how many pixels 203 correspond to each illuminant 1812 (i.e., for how many pixels 203 each illuminant 1812 was selected) is then computed. The illuminant 1812A with the largest value in histogram 1811, (i.e., the illuminant 1812A selected by the most pixels 203) is used as the scene illuminant along with its corresponding white balance factors.

Improving Accuracy of Pixel Values in the Presence of Saturation

The above-described sequence of demodulation followed by demosaicing is intended to generate pixels with accurate chrominance and luminance. Accuracy in these calculations presumes that the pixel values in the sensor image are themselves accurate. However, in cases where sensor saturation has taken place, the pixel values themselves may not be accurate. Specifically, sensor saturation may corrupt both pixel chrominance and luminance when they are computed as described above.

According to various embodiments of the present invention, the accuracy of pixel values can be improved, even when they are computed in the presence of sensor saturation. The following are two examples of techniques for improving the accuracy of pixel values; they can be applied either singly or in combination:

- Single-channel pixel values in the sensor image can be directly adjusted, based on the estimation of the color of scene illumination; and
- The chrominance of pixels can be steered toward the estimated chrominance of the scene illumination, in proportion to the risk that these colors are corrupted due to sensor saturation.

For example, consider the case of complete sensor saturation, where all pixels 203—red, green, and blue—in a region are saturated. In such a situation, it is known that the luminance in the region is high, but chrominance is not known, because all r/g and b/g ratios are possible. However, an informed guess can be made about chrominance, which is that it is likely to be the chrominance of the scene illumination, or an approximation of it. This informed guess can be made because exceptionally bright objects in the scene are likely to be the light source itself, or specular reflections of the light source. Directly-imaged light sources are their own chrominance. The chrominance of specular reflections (reflections at high grazing angles, or off mirror-like surfaces at any angle) may also be the chrominance of the light source, even when the object's diffuse reflectivity has spectral variation (that is, when the object is colored). While objects of any chrominance may be bright enough to cause sensor saturation, gray objects, which reflect all visible light equally, are more likely to saturate all three color channels simultaneously, and will also take on the chrominance of the scene illumination.

If a sensor region is only partially saturated, then some information about chromaticity may be inferred. The pattern of saturation may rule out saturation by the scene illumination chrominance, if, for example, red pixels 203 are saturated and green pixels 203 are not, but the r/g ratio of the scene illumination color is less than one. But the presence of signal noise, spatial variation in color, and, especially in light-field cameras, high degrees of disk modulation, make inferences about chrominance uncertain even in such situations. Thus the chrominance of the scene illumination remains a good guess for both fully and partially saturated sensor regions.

Clamping Sensor Values to the Color of the Scene Illumination

The sensitivity of digital sensor 803 (its ISO) may be adjusted independently for its red, green, and blue pixels 203. In at least one embodiment, it may be advantageous to adjust relative sensitivities of these pixels 203 so that each color saturates at a single specific luminance of light corresponding to the chrominance of the scene illumination. Thus, no pixels 203 are saturated when illuminated with light of the scene-illumination chrominance at intensities below this threshold, and all pixels 203 are saturated when illuminated with light of the scene-illumination chrominance at intensities above this threshold.

An advantage of such an approach is that quantization error may be reduced, because all pixels 203 utilize their full range prior to typical saturation conditions. Another advantage is that, at least in sensor regions that experience relatively constant modulation, sensor saturation effectively clamps chrominance to the chrominance of the illuminant. Thus, subsequent demosaicing will infer the chrominance of the illuminant in clamped regions, because the r/g and b/g ratios will imply this chrominance. Even when modulation does change rapidly, as it may in a light-field image, the average demosaiced chrominance approximates the chrominance of the scene illumination, even while the chrominances of individual pixels 203 depart from this average.

Figure 19:
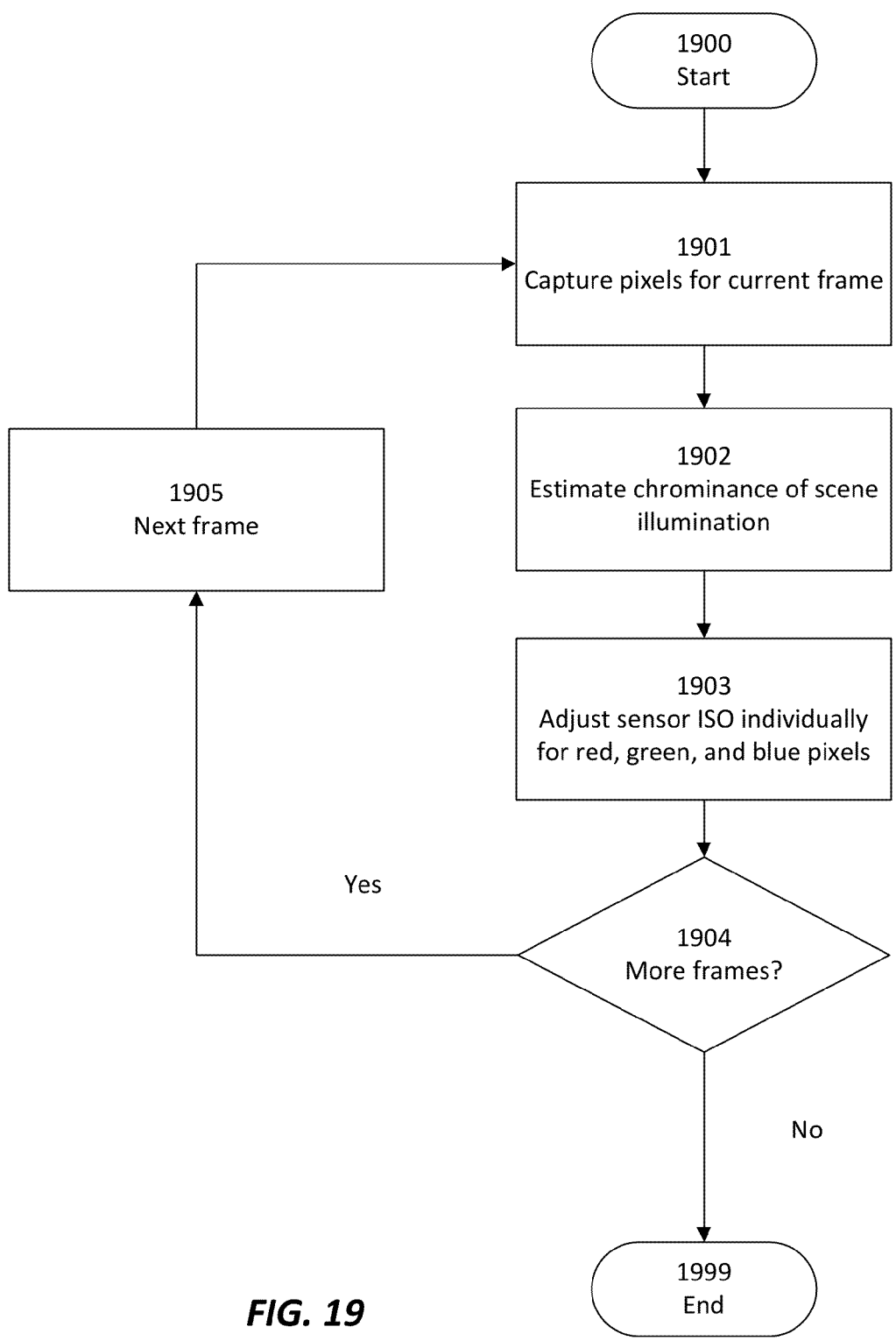
FIG. 19 is a flow diagram depicting a method of iteratively adjusting sensor ISO, according to one embodiment of the present invention.

Referring now to FIG. 19, there is shown a flow diagram depicting a method of iteratively adjusting sensor ISO, according to one embodiment of the present invention. An assumption can be made that the chrominance of the scene illumination does not change substantially from frame to frame. Accordingly, as depicted in FIG. 19, sensor ISO for each subsequent captured frame can be adjusted as follows. Pixels 203 for the current frame are captured 1901. The captured pixels are processed through demodulation, demosaicing, and AWB to estimate 1902 the chrominance of the scene illumination. Using the resulting estimation of this chrominance, sensor ISO (a.k.a. gain) is adjusted 1903 individually for red, green, and blue pixels 203. If more frames are available 1904, the next frame is taken 1905, and steps 1901 through 1903 are repeated using that frame's pixels 203.

Figure 20:
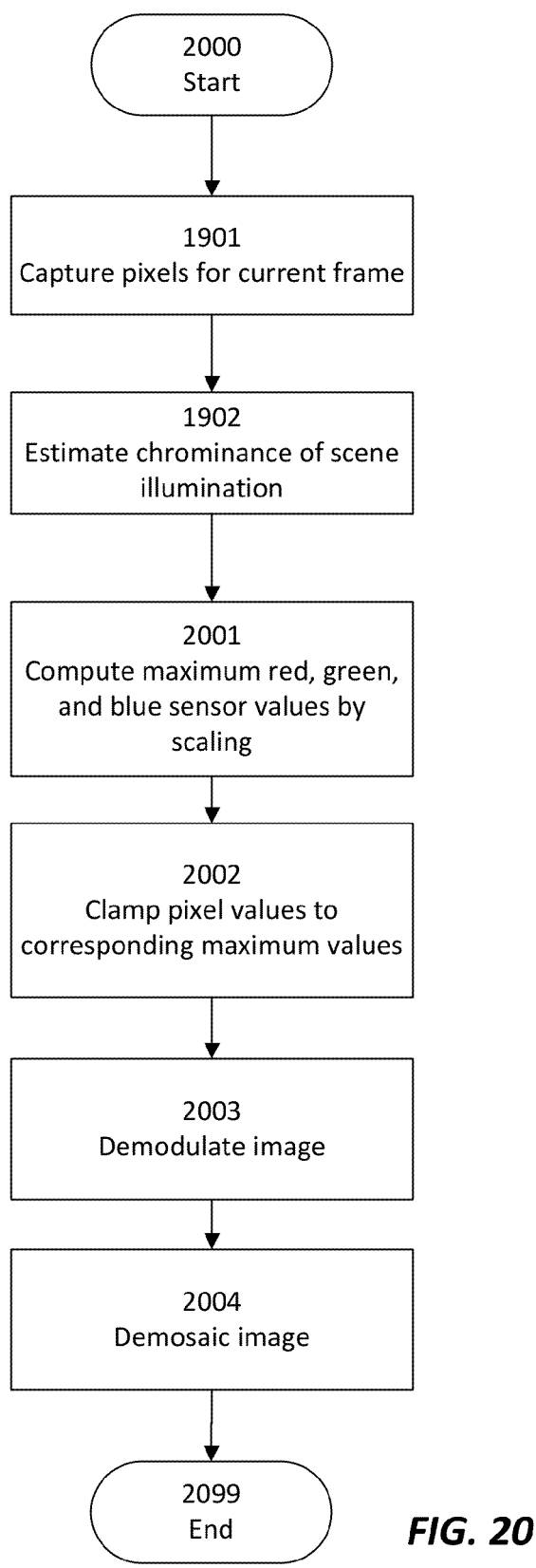
FIG. 20 is a flow diagram depicting a method of clamping pixel values to chrominance of scene illumination, according to one embodiment of the present invention.

A feedback loop as depicted in FIG. 19 may be feasible if implemented on a camera or other image capture device. However, such feedback is not generally available when a sensor image is being processed after it has been captured, stored, and possibly transferred to another device, since it is then too late to specify adjusted sensor ISO for subsequent images. In such cases, the pixel values can still be clamped to the chrominance of the scene illumination. Referring now to FIG. 20, there is shown a flow diagram depicting a method for clamping pixel values to chrominance of scene illumination, according to one embodiment of the present invention.

Pixels 203 for the current frame are captured 1901. The captured pixels 203 are processed through demodulation, demosaicing, and AWB to estimate 1902 the chrominance of the scene illumination. Maximum red, green, and blue sensor values are computed 2001 by scaling the red, green, and blue components of the scene-illumination chrominance equally, such that the largest component is equal to 1.0. The value of each pixel 203 in the sensor image is clamped 2002 to the corresponding maximum value. As an optimization, pixels of the color channel whose maximum is 1.0 need not be processed, because they have already been limited to this maximum by the mechanics of sensor saturation.

After the sensor image has been clamped 2002 in this manner, it may be demodulated 2003 and demosaiced 2004 again before subsequent processing is performed. As an optimization, the color channel that was not clamped (because its maximum was already 1.0) need not be demodulated again, but the other two color channels may be.

Figure 10:
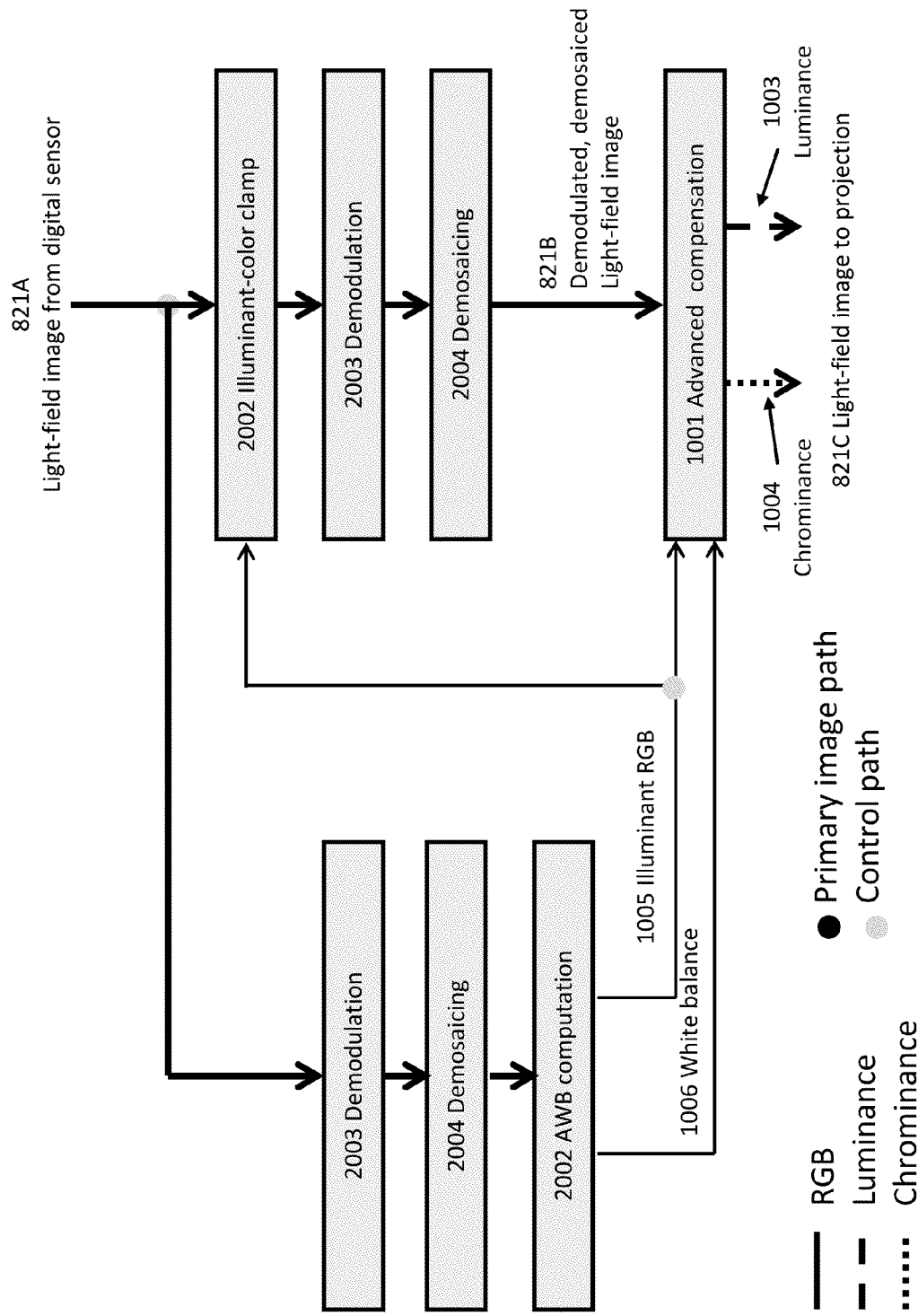
FIG. 10 is a flow diagram depicting a method for pre-projection light-field image processing according to one embodiment of the present invention.

Referring now to FIG. 10, there is shown a flow diagram depicting a method for pre-projection light-field image processing according to one embodiment of the present invention. Light-field image data 821A is received from digital sensor 803. Clamping 2002 is performed on red, blue and green color components, followed by demodulation 2003 and demosaicing 2004, as described above, to generate demodulated, demosaiced light-field image data 821B. In at least one embodiment, advanced compensation 1001 is performed on red, blue, and green components, as described in more detail below in connection with FIG. 12. The output of advanced compensation 1001 is light-field image data 821C in the form of luminance 1003 and chrominance 1004 values.

A control path is also depicted in FIG. 10. Light field image data 821A is used for controlling the parameters of demodulation 2003 and demosaicing 2004 steps. AWB computation 1002 generates illuminant RGB value 1005 and white balance value 1006, that are used as control signatures for advanced compensation 1002, as described in more detail below in connection with FIG. 12. Illuminant RGB value 1005 is also used as a control signal for illuminant-color clamp operation 2002, as described above.

Figure 11:
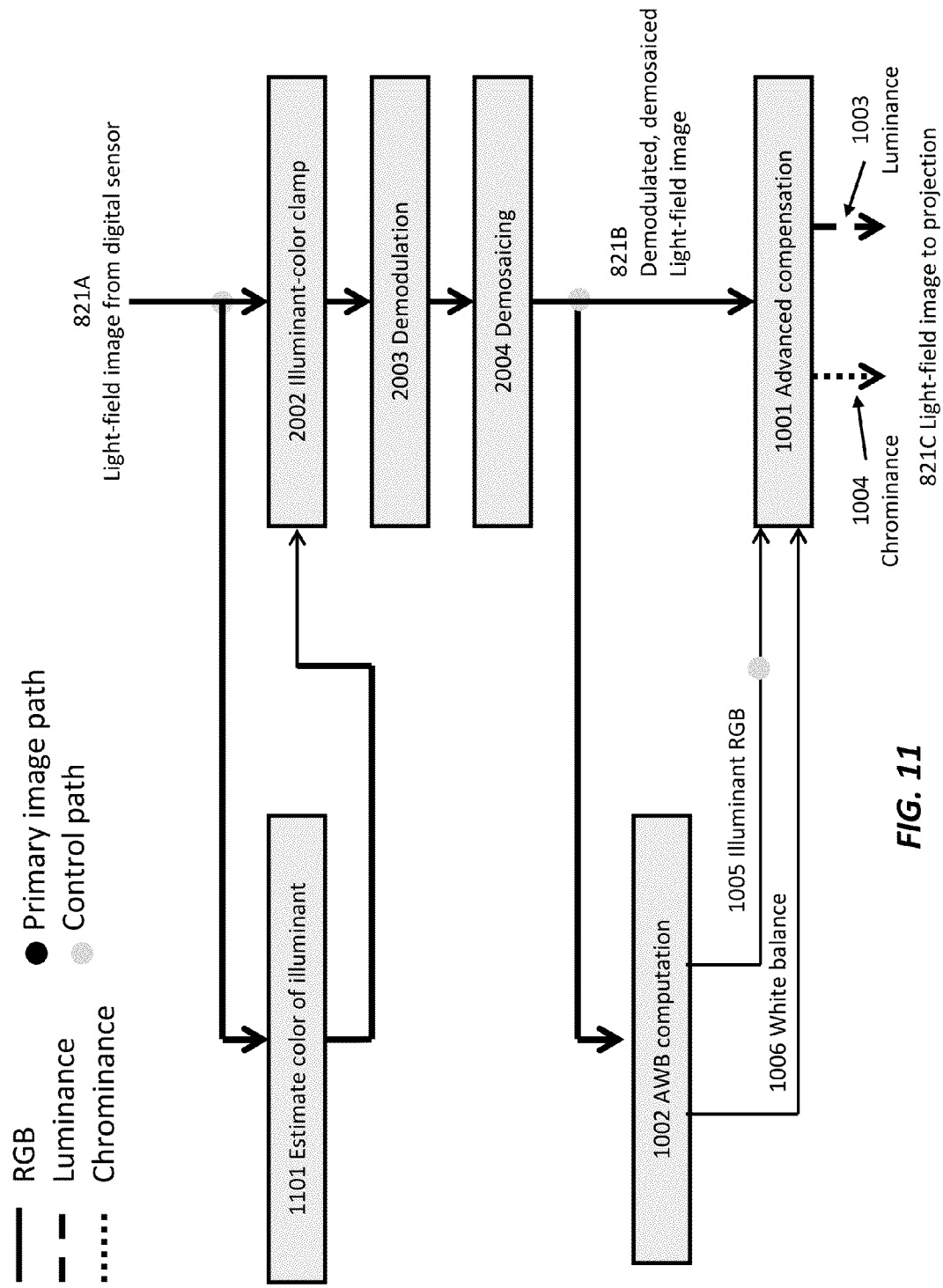
FIG. 11 is a flow diagram depicting a simplified method for pre-projection light-field image processing, according to another embodiment of the present invention.

In at least one embodiment, a simpler technique for preprojection light-field image processing is used, wherein the chrominance of the illuminant is actually computed twice, first as a rough approximation (which does not require that the image be first demodulated and demosaiced), and then again after the image is clamped, demodulated, and demosaiced, when it can be computed more accurately for subsequent use. Referring now to FIG. 11, there is shown a flow diagram depicting this simplified method. Here, illuminant color for clamp 2002 is estimated 1101 from light-field image data 821A, rather than by using demodulation 2003 and demosaicing 2004 steps. Demodulation 2003 and demosaicing 2004 steps are still performed, to generate image data 821B used as input to advanced compensation step 1001. AWB computation 1002 still takes place, using control signals from demodulation 2003 and demosaicing 2004 steps.

The technique of FIG. 11 may provide improved efficiency in certain situations, because it avoids the need for twice demodulation and demosaicing the full light-field image 821A. As a trade-off, however, the technique of FIG. 11 involves twice computing illuminant chrominance, once in step 1101 (as an estimate), and again in step 1002.

Advanced Compensation

While the above-described light-field clamping technique section substantially reduces false-color artifacts in images projected from the light field, some artifacts may remain. In one embodiment, additional techniques can be applied in order to further reduce such artifacts, especially to the extent that they result from sensor saturation.

Figure 7:
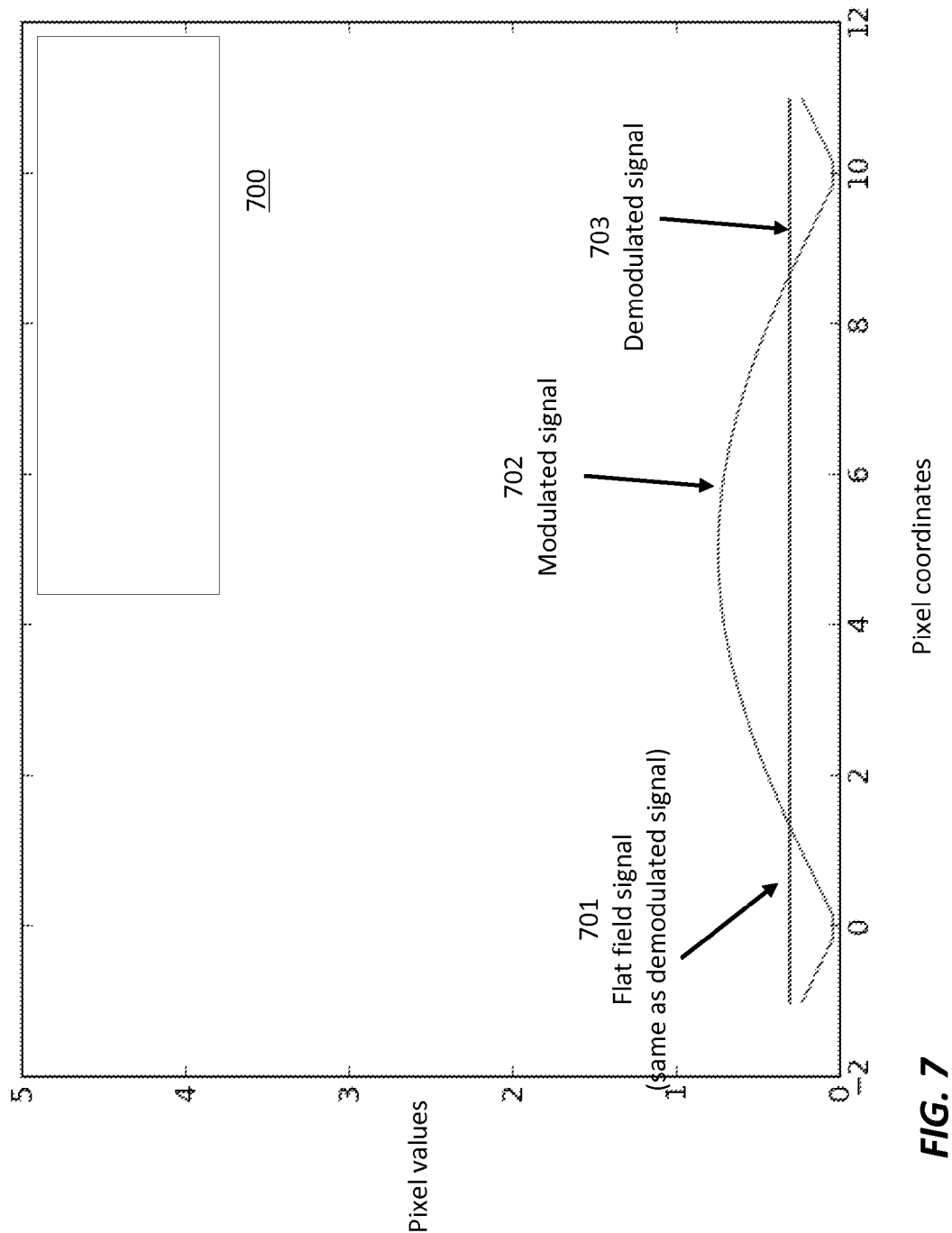
FIG. 7 is a graph depicting an example of unsaturated demodulation of a flat field.

Referring now to FIG. 7, there is shown a graph 700 depicting an example of unsaturated demodulation of a flat field associated with a disk 102. As shown in graph 700, modulated signal 702 does not exceed 1.0, the maximum representable value in the sensor itself; accordingly, there is no sensor saturation, and no pixel values are clamped. Thus, demodulated signal 703 is identical to flat-field signal 701.

Figure 8:
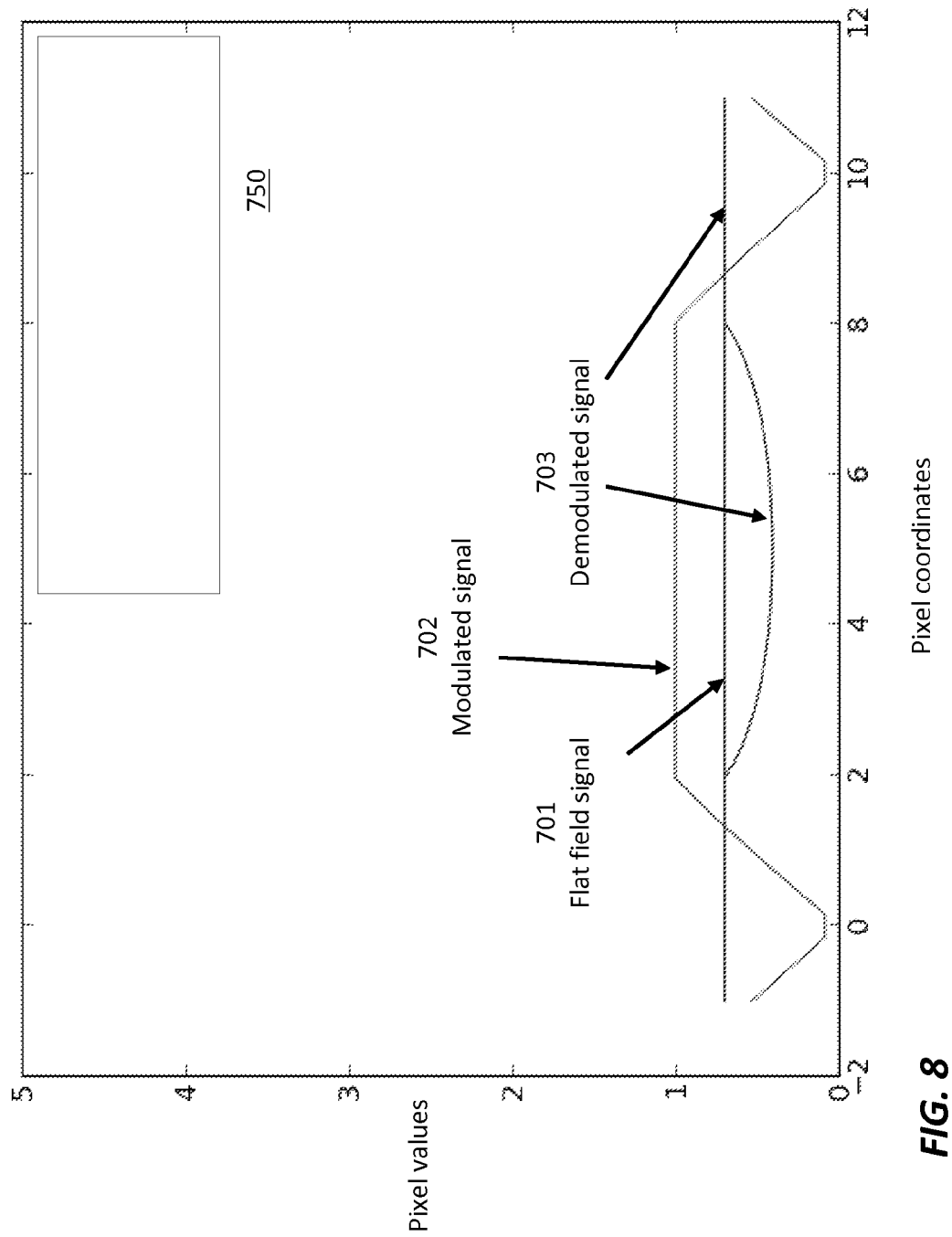
FIG. 8 is a graph depicting an example of saturated demodulation of a flat field having higher luminance.

Referring now to FIG. 8, there is shown a graph 750 depicting an example of saturated demodulation of a flat field having higher luminance. Here, values of modulated signal 702 near the center of disk 102 exceed 1.0, but they are clamped to 1.0 by sensor saturation. As a result of this signal corruption, demodulated signal 703 does not match original flat-field signal 701. Instead, demodulated signal 703 dips into a U-shaped arc corresponding to the center area of disk 102.

Figure 9:
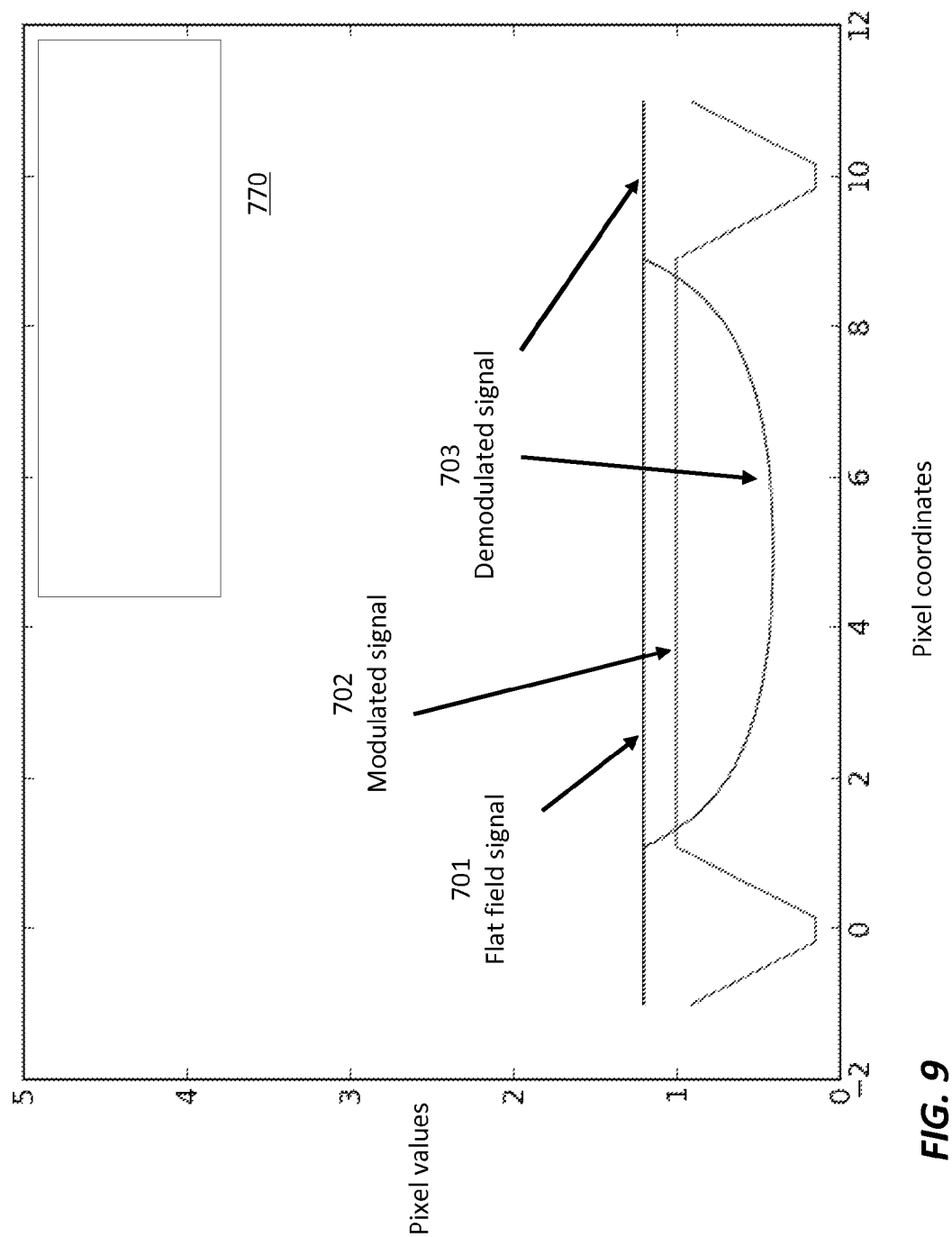
FIG. 9 is a graph depicting an example of extremely saturated demodulation of a flat field having higher luminance.

Referring now to FIG. 9, there is shown a graph 770 depicting an example of extreme saturation. Here, demodulated signal 703 matches original flat-field signal 701 only at the edges of disk 102. Demodulated signal 703 is characterized by a deep U-shaped arc corresponding to the center area of disk 102, falling to a value that is a small fraction of the original signal value.

Figure 12:
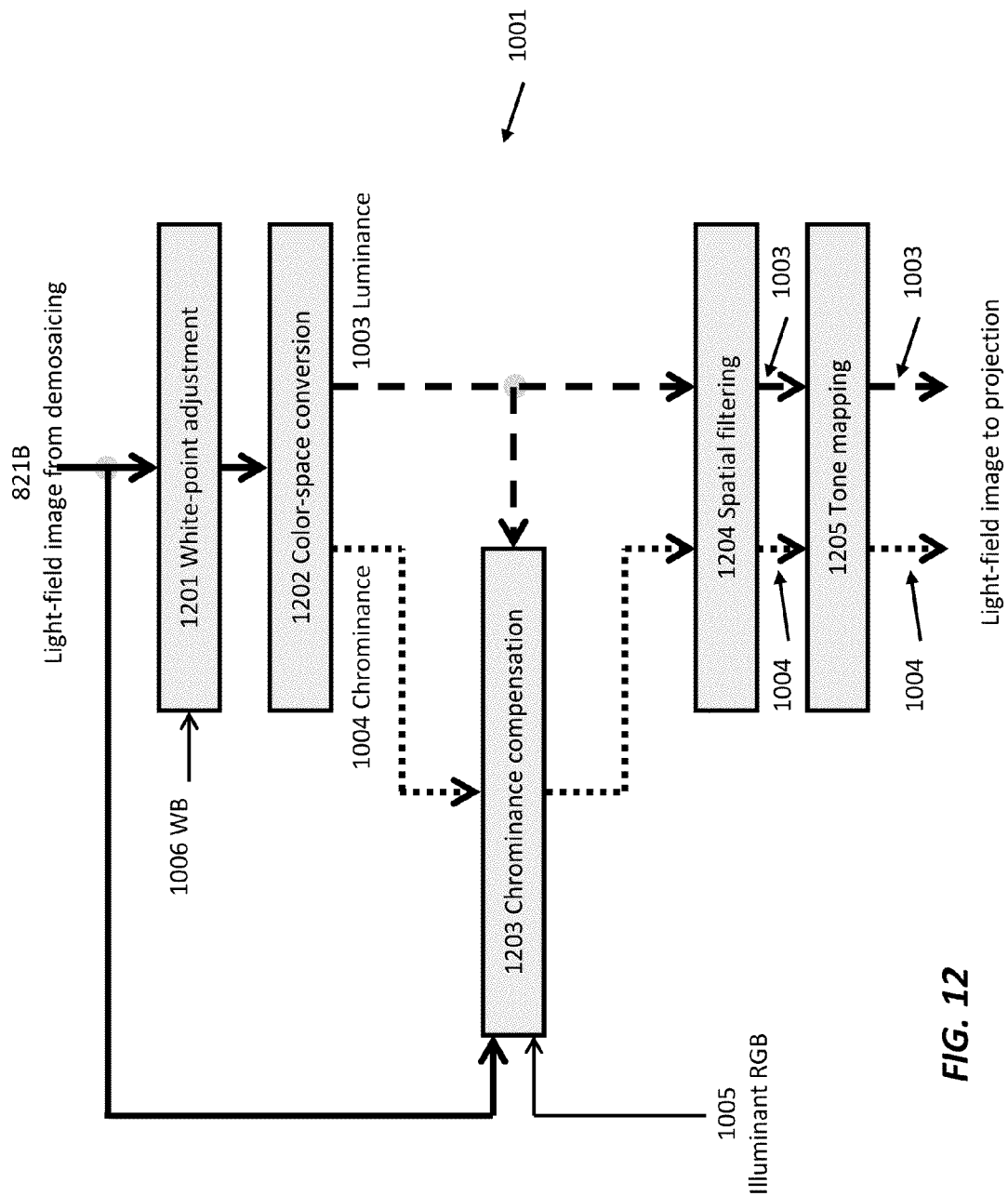
FIG. 12 is a flow diagram depicting advanced compensation as can be used in connection with either of the methods depicted in FIGS. 10 and/or 11, according to one embodiment of the present invention.

Because proportionality is violated by this uneven signal reconstruction, subsequent demosaicing may result in incorrect chrominances, causing artifacts. Artifacts in luminance may also occur, depending on the 2-D pattern of ray intersections with the plane of projection. In one embodiment, such saturation-related artifacts are minimized by subsequent processing, referred to herein as advanced compensation. Referring now to FIG. 12, there is shown a flow diagram depicting a method 1001 of advanced compensation, according to one embodiment. This method can be used in connection with either of the methods described above in connection with FIGS. 10 and/or 11.

In the advanced compensation method depicted in FIG. 12, previously computed white-balance value 1006 is applied, in a white-point adjustment step 1201. As described earlier, in white-point adjustment process 1201, each pixel color component is scaled by a corresponding white-balance scale factor. For example, the red component of each pixel in the light field image is scaled by the red white-balance factor. In one embodiment, white-balance factors may be normalized, so that their application may make no change to the luminance of the light-field image, while affecting only its chrominance.

Color-space conversion step 1202 is then performed, wherein each pixel's 203 red, green, and blue components are converted into chrominance 1004 and luminance 1003 signals. As described above, chrominance may be represented as a 2-component tuple, while luminance may be represented as a single component. Any known technique can be used for converting red, green, and blue components into chrominance 1004 and luminance 1003 signals, and any known representations of chrominance 1004 and luminance 1003 can be used. Examples include YUV (Y representing luminance 1003, U and V representing chrominance 1004) and L*a*b* (L* representing luminance 1003, a* and b* representing chrominance 1004). Some representations, such as YUV, maintain a linear relationship between the intensity of the RGB value (such an intensity may be computed as a weighted sum of red, green, and blue) and the intensity of luminance 1003 value. Others, such as L*a*b*, may not maintain such a linear relationship. It may be desirable for there to be such a linear relationship for chrominance 1004 and/or for luminance 1003. For example, luminance value 1003 may be remapped so that it maintains such a linear relationship.

In at least one embodiment, three additional operations, named chrominance compensation 1203, spatial filtering 1204, and tone mapping 1205, are performed separately on chrominance 1004 and luminance 1003 signals, as described in more detail below.

Chrominance Compensation 1203

Figure 13:
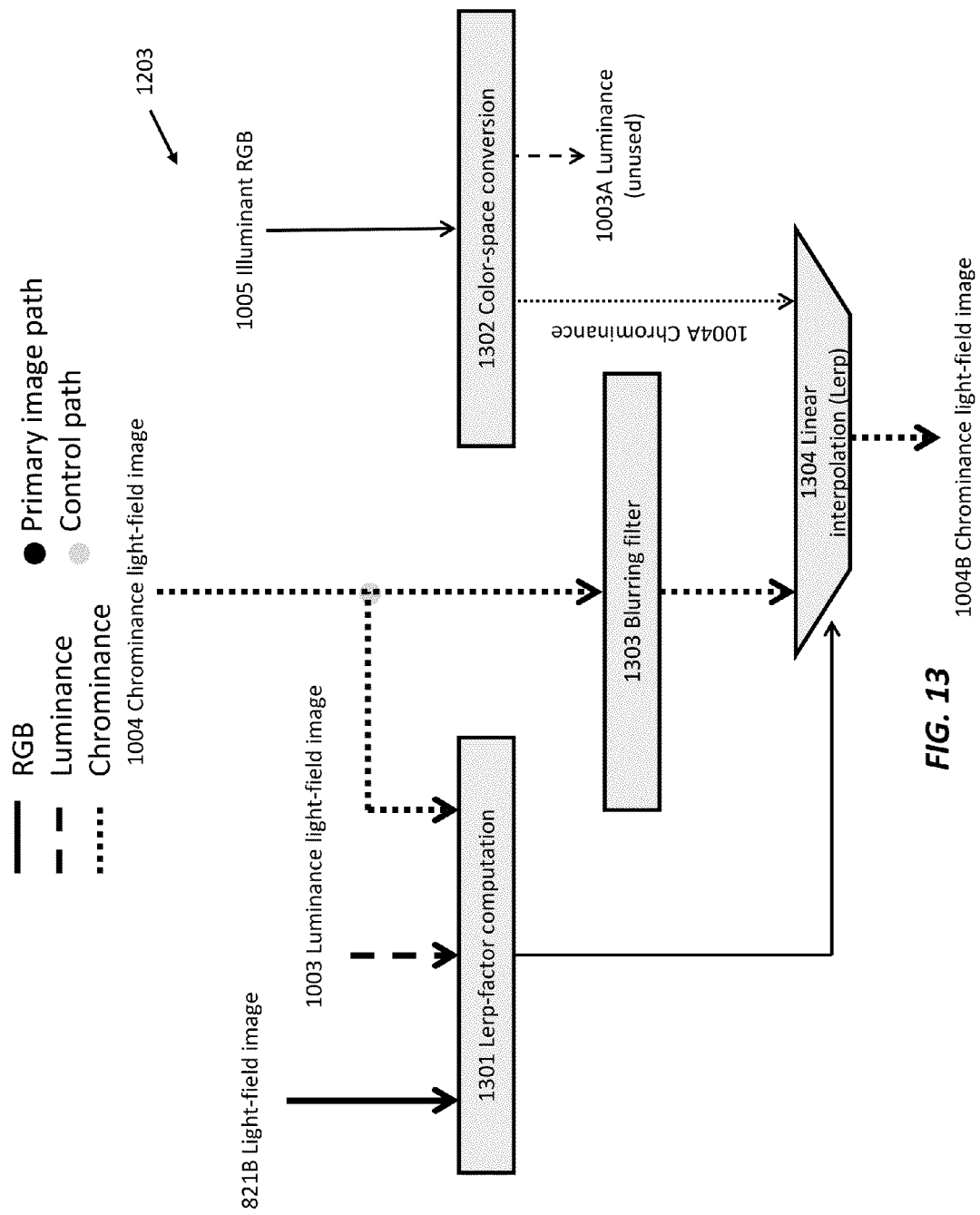
FIG. 13 is a flow diagram depicting a method of chrominance compensation, according to one embodiment of the present invention.

Referring now to FIG. 13, there is shown a flow diagram depicting a method of chrominance compensation 1203, as can be implemented as part of advanced compensation method 1001, according to one embodiment of the present invention. In one embodiment, chrominance compensation is applied only to the chrominance component 1004 of light-field image 821B, also referred to as chrominance light-field image 1004.

Each pixel 203 in chrominance light-field image 1004 is considered individually. Lerp-factor computation 1301 estimates the severity of each pixel's 203 saturation, and the likelihood that the chrominance of that saturation matches (or approximates) the estimated chrominance of the scene illumination. For example, if a pixel's luminance value is near saturation, it is more likely that the chrominance value is wrong. Accordingly, in at least one embodiment, the system of the present invention uses a weighting between saturation and near saturation to determine how much to shift the chrominance value.

When a pixel's 203 saturation is severe, and there is high likelihood that the pixel's chrominance is equal to the chrominance of the scene illumination, the pixel's 203 chrominance is replaced with the chrominance of the scene illumination. When there is no saturation, the pixel's 203 chrominance is left unchanged. When the pixel's 203 saturation is moderate, and there is an intermediate probability that the saturation is equal to the estimated chrominance of the scene illumination, Lerp-factor computation 1301 produces an output that is intermediate between 0.0 and 1.0. This intermediate value causes the pixel's 203 chrominance to be replaced with a linear combination (such as a linear interpolation, or "Lerp") 1304 between the pixel's 203 original chrominance and the chrominance of the scene illumination. For example, if the computed Lerp factor was 0.25, and the pixel's 203 chrominance representation was UV, then the output of the linear interpolation would be $$U' = (1.0 - 0.25)U + 0.25 U_{illumination} \quad (Eq. 1)$$

$$V' = (1.0 - 0.25)V + 0.25 V_{illumination} \quad (Eq. 2)$$

Any of a variety of Lerp-factor computation algorithms may be used. For example, a simple calculation might combine the red (R), green (G), and blue (B) components of the pixel 203, prior to its color-space conversion, as follows:

$$f_{lerp} = G(1 - |R - B|) \quad (Eq. 3)$$

In another embodiment, the Lerp factor can be computed by look-up into a two-dimensional table, indexed in one dimension by an estimation of the severity of saturation, and in the other dimension by an estimation of how closely the saturation chrominance approximates the estimated chrominance of the scene illumination. These indexes can be derived from any functions of the pixel's 203 pre-color-space-conversion R, G, and B values, and its post-color-space-conversion luminance 1003A and chrominance 1004A values (as derived from color-space conversion step 1302). FIG. 13 illustrates this generality by providing all these values 821B, 1003, 1004, 1003A, 1004A, as inputs to Lerp-factor computation step 1301, and/or to Lerp step 1304. The look-up itself can interpolate the nearest values in the table, such that its output is a continuous function of its indexes.

Although linear interpolation is described herein for illustrative purposes, one skilled in the art will recognize that any other type of blending or interpolation can be used.

It may be desirable to blur the chrominance light-field image 1004 prior to linear interpolation 1304 with the estimated chrominance of the scene illumination. Blurring filter 1303 may thus be applied to chrominance light-field image 1004 before it is provided to linear interpolation step 1304.

Spatial Filtering 1204

Figure 14:
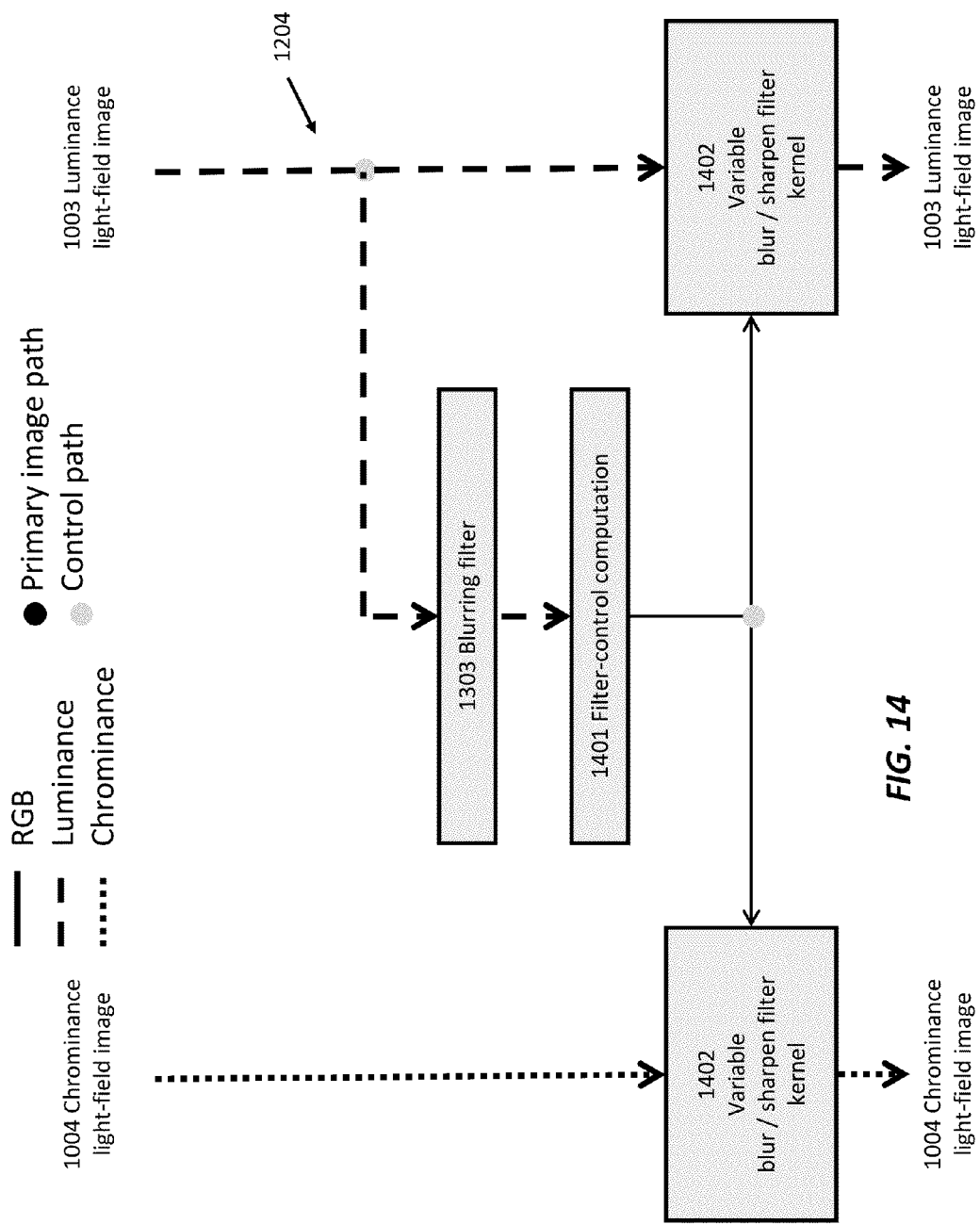
FIG. 14 is a flow diagram depicting a method of spatial filtering, according to one embodiment of the present invention.

Referring now to FIG. 14, there is shown is a flow diagram depicting a method of spatial filtering 1204, as can be implemented as part of advanced compensation method 1001, according to one embodiment of the present invention.

In one embodiment, spatial filtering 1204 is applied separately to both the luminance 1003 and chrominance 1004 light-field images. An individualized variable blur/sharpen filter kernel 1402 is used to compute each output pixel's 203 value. This kernel 1402 may either sharpen or blur the image, as specified by a continuous value generated by filter control computation 1401.

In at least one embodiment, input to filter control computation 1401 is a single pixel 203 of a blurred version of luminance light-field image 1003, as generated by blurring filter 1303. In at least one embodiment, filter control computation 1401 estimates the likelihood and severity of pixel saturation, without consideration for the chrominance of that saturation. When saturation is present, filter control computation 1401 generates a value that causes kernel 1402 to blur the light-field images. Such blurring may serve to smooth uneven demodulated values. When saturation is not present, filter control computation 1401 generates a value that causes kernel 1402 to sharpen the images. Such sharpening may compensate for blurring due to imperfect microlenses and due to diffraction. Intermediate pixel conditions result in intermediates between blurring and sharpening of the light-field images.

In one embodiment, two filtered versions of the light-field image are generated: an unsharp mask, and a thresholded unsharp mask in which the positive high-pass image detail has been boosted and the negative high-pass detail has been eliminated. The system then interpolates between these versions of the image using filter control computation 1401. When filter control computation 1401 has a low value (in regions that are not saturated), the unsharp mask is preferred, with the effect of sharpening the image. When filter control computation 1401 has a high value (in regions that are likely to be saturated), the thresholded unsharp mask is preferred. Thresholding "throws out" negative values in the high-pass image, thus removing clamped demodulated pixel values in the saturated region, and leaving valuable demodulated interstitial pixel values.

In various embodiments, any of a variety of filter control computation 1401 algorithms may be used.

Tone Mapping 1205

Figure 15:
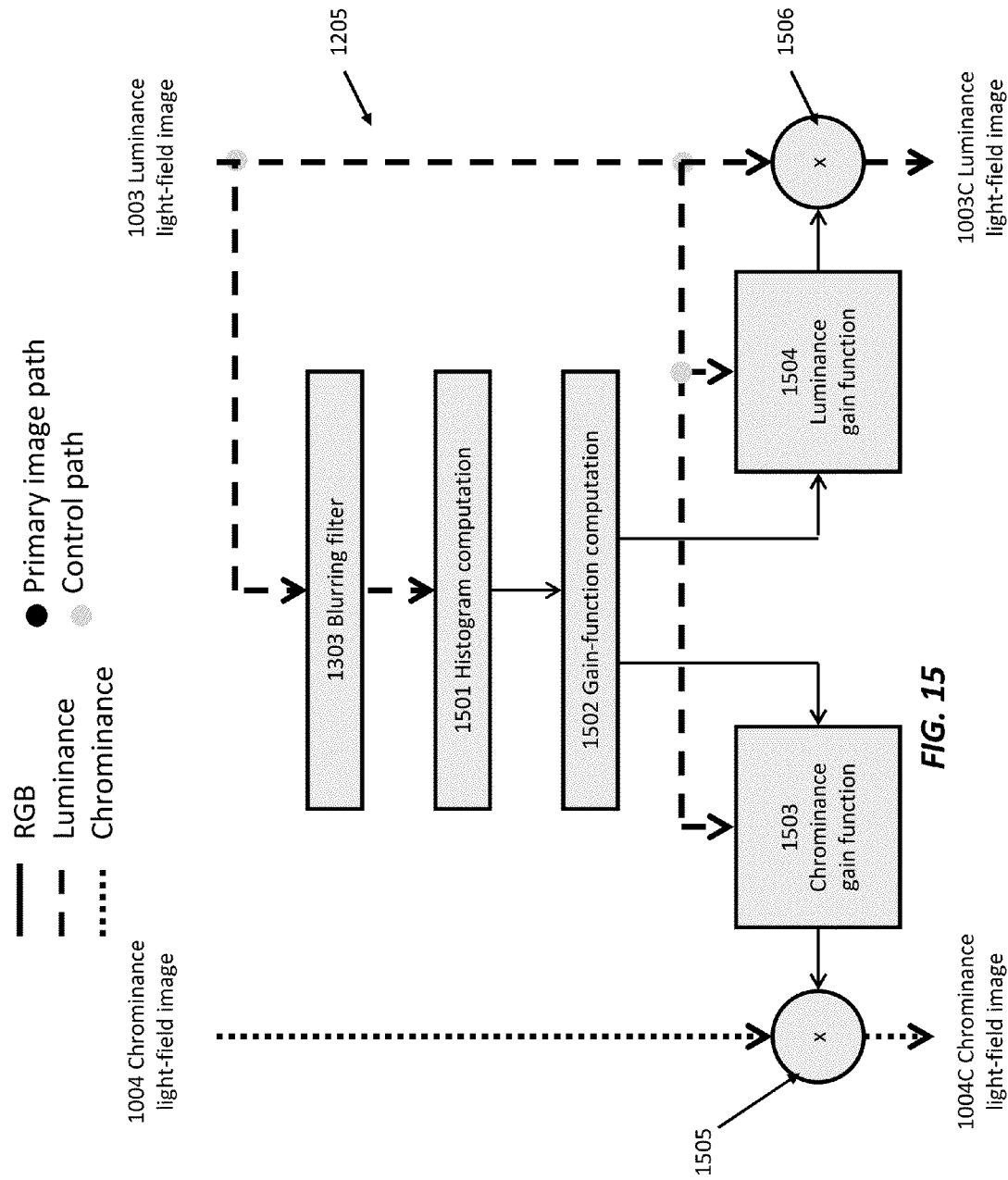
FIG. 15 is a flow diagram depicting a method of tone mapping, according to one embodiment of the present invention.

Referring now to FIG. 15, there is shown is a flow diagram depicting a method of tone mapping 1205, as can be implemented as part of advanced compensation method 1001, according to one embodiment of the present invention.

In one embodiment, spatial filtering 1204 is applied separately to both the luminance 1003 and chrominance 1004 light-field images. Before any light-field pixels 203 are processed, two gain functions are computed: a luminance gain function 1504 and a chrominance gain function 1503. Functions 1503, 1504 may have any of a variety of representations. For example, they may be represented as one-dimensional tables of values. Each function 1503, 1504 maps an input luminance value 1003 to an output scale factor. After the functions have been created, pixels 203 in the incoming chrominance and luminance light-field images 1004, 1003 are processed individually, in lock step with one another. The luminance pixel value is presented as input to both gain functions 1503, 1504, generating two scale factors: one for chrominance and one for luminance. Both components of the chrominance pixel value are multiplied 1505 by the chrominance scale factor determined by gain function 1503, in order to generate the output chrominance pixel values for output chrominance light-field image 1004C. The luminance pixel value from luminance light-field image 1003 is multiplied 1506 by the luminance scale factor determined by gain function 1504, in order to generate the output luminance pixel values for output luminance light-field image 1003C.

Gain functions 1503, 1504 may be generated with any of a variety of algorithms. For example, in at least one embodiment, gain functions 1503, 1504 may be generated by applying a blurring filter 1303 to luminance light-field image 1003, then determining 1501 a histogram of luminance values taken from the blurred version, and computing 1502 gain functions 1503, 1504 therefrom. For example, gain-function computation 1502 may be performed by using the histogram data from step 1501 to shape the gain functions such that the values of pixels 203 processed by gain functions 1503, 1504 are more evenly distributed in the range from 0.0 to 1.0. Thus, in effect, the gain function weights the luminance channel so that the scene has an appropriate amount of dynamic range.

Synergy

The above described techniques can be implemented singly or in any suitable combination. In at least one embodiment, they are implemented in combination so as to can work synergistically to reduce color artifacts due to sensor saturation. For example, consider a scene with a region of increasing luminance but constant chrominance. The sensor region corresponding to this scene region may be divided into three adjacent sub-regions:

An unsaturated sub-region, in which all pixel values are reliable;

A transition sub-region, in which pixels of some colors are saturated, and pixels of other colors are not saturated; and A blown-out sub-region, in which all pixels are saturated.

Pixel values in the unsaturated sub-region will not be changed by clamping, and their chrominance will not be changed by interpolation. Pixels in the blown-out sub-region will be clamped such that subsequent demosaicing gives them chrominances clustered around of the estimated illumination color, with variation introduced by demodulation. The advanced compensation techniques described above may then be used to reduce these variations in pixel chrominance by interpolating toward the chrominance of the estimated scene-illumination color. Interpolation is enabled because 1) the sub-region is obviously blown out, and 2) the pixel chrominances do not vary too much from the chrominance of the estimated scene-illumination color.

If the chrominance of the scene region matches the chrominance of the estimated scene-illumination color, there will be no transition sub-region; rather, the unsaturated sub-region will be adjacent to the blown-out sub-region. If the chrominance of the scene region differs somewhat from the chrominance of the estimated scene-illumination color, there will be a transition sub-region. In this transition sub-region, clamping ensures that any large difference between pixel chrominance and the chrominance of the estimated scene-illumination color is the result of a true difference in the scene region, and not the result of sensor saturation (which, depending on gains, could substantially alter chrominance). Small differences will then be further reduced by the advanced compensation techniques described above as were small differences in the saturated sub-region. Large differences, which correspond to true differences in the saturated sub-region, will not be substantially changed by advanced compensation techniques, allowing them to be incorporated in the final image.

Variations

The techniques described herein can be extended to include any or all of the following, either singly or in any combination.

Demodulation of a light-field image;

Taking samples only from selected portions of disks 102 to the AWB computation; these may be the centers of disks 102, or any other suitable portions of disks 102, depending on MLA shape and modulation function;

Computing an estimate of the color of the scene illumination, scaling this estimate such that its maximum value is one, and then clamping every pixel 203 in the Bayer light-field image to the corresponding component;

Color compensation; and

Filtering separately in luminance and chrominance domains to recover the maximum amount of scene dynamic range and detail while suppressing noise and highlight artifacts.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. In a light-field image capture device having a plurality of microlenses, a method for compensating for sensor saturation and microlens modulation, comprising:
   in a processor, determining a flat-field response contour for each of at least one region of an image sensor;
   in the processor, generating a modulation image based on the at least one flat-field response contour;
   in the processor, generating a demodulation image from the modulation image;
   in the processor, receiving light-field image data;
   in the processor, applying the generated demodulation image to the received light-field image data to generate a demodulated light-field image; and
   outputting the light-field demodulated image on a display device.

2. The method of claim 1, wherein determining each flat-field response contour comprises determining a flat-field response contour for a region corresponding to a microlens in the plurality of microlenses.

3. The method of claim 1, wherein determining each flat-field response contour comprises determining a flat-field response contour for a region projected by one of the microlenses.

4. The method of claim 1, wherein the at least one region of the image sensor comprises a plurality of pixels, wherein some of the pixels have different spectral sensitivities than others of the pixels, and wherein:
   determining a flat-field response contour comprises determining a flat-field response contour for each of the different spectral sensitivities; and
   generating a demodulation image comprises generating a demodulation image indicating demodulation values for each of the different spectral sensitivities.

5. The method of claim 4, wherein the pixels in the at least one region are arranged in a Bayer pattern.

6. The method of claim 1, wherein the at least one region of the image sensor comprises a plurality of pixels, wherein some of the pixels have different spectral sensitivities than others of the pixels, and wherein:
   determining a flat-field response contour comprises determining a flat-field response contour for each of the different spectral sensitivities; and
   generating a demodulation image comprises generating demodulation images for each of the different spectral sensitivities.

7. The method of claim 6, wherein the pixels in the at least one region are arranged in a Bayer pattern.

8. The method of claim 1, wherein generating a modulation image comprises generating a plurality of modulation images, each modulation image being associated with a set of parameters of the light-field image capture device.

9. The method of claim 8, wherein applying the generated demodulation image to the received light-field image data comprises:
   determining a set of parameters for the received light-field image data;
   selecting a generated modulation image corresponding to the determined parameters;
   generating a demodulation image from the selected modulation image; and
   applying the generated demodulation image to the received light-field image data.

10. The method of claim 8, wherein applying the generated demodulation image to the received light-field image data comprises:
   determining a set of parameters for the received light-field image data;
   generating an interpolated modulation image by interpolating between at least two generated modulation images based on the determined parameters;
   generating a demodulation image from the generated modulation image; and applying the generated demodulation image to the received light-field image data.

11. The method of claim 1, further comprising storing the generated modulation image in a storage device.

12. The method of claim 1, further comprising storing the generated demodulation image in a storage device.

13. The method of claim 1, wherein the modulation image comprises a plurality of pixels having values, and wherein generating a demodulation image from the modulation image comprises determining a reciprocal of each pixel value.

14. The method of claim 1, wherein the demodulated light-field image comprises a plurality of pixels, each pixel being associated with a plurality of values, each value corresponding to a different spectral range, the method further comprising applying a demosaicing operation to the demodulated light-field image.

15. The method of claim 14, wherein applying a demosaicing operation to the demodulated light-field image comprises, for each pixel in the demodulated light-field image, estimating at least one value based on at least one value of a nearby pixel.

16. The method of claim 1, further comprising:
estimating a scene illumination color; and
adjusting pixel values based on the estimated scene illumination color.

17. The method of claim 1, further comprising:
estimating a scene illumination color; and
for each pixel:
determining a probability that the pixel is saturated; and
steering a chrominance value for the pixel toward the estimated scene illumination color, wherein the steering is performed to an extent proportional to the determined probability.

18. The method of claim 1, wherein the demodulated light-field image comprises a plurality of pixels, each pixel being associated with a plurality of values, each value corresponding to a different spectral range, and wherein the method further comprises:
converting the demodulated light-field image to chrominance and luminance data.

19. The method of claim 1, further comprising, prior to outputting the light-field demodulated image, applying an automatic white-balance correction algorithm to the demodulated light-field image.

20. The method of claim 1, wherein receiving light-field image data for processing comprises receiving a light-field image comprising a plurality of pixels, each pixel having a chrominance value, the method further comprising, prior to outputting the light-field demodulated image,
calibrating the light-field image capture device with a plurality of illuminants;
storing, in a storage device, a chrominance associated with each illuminant;
for each pixel in the received light-field image:
determining a demosaiced chrominance value;
plotting the determined demosaiced chrominance value in Cartesian space;
calculating a vector between the plotted demosaiced chrominance value and each illuminant chrominance;
selecting an illuminant having a lowest-magnitude vector among the calculated vectors;
determining which illuminant was selected for the most pixels; and
applying an automatic white-balance correction algorithm, using the determined illuminant, to the light-field demodulated image.

21. A computer program product for compensating for sensor saturation and microlens modulation in a light-field image capture device having a plurality of microlenses, comprising:
a non-transitory computer-readable storage medium; and
computer program code, encoded on the medium, configured to cause at least one processor to perform the steps of:
determining a flat-field response contour for each of at least one region of an image sensor;
generating a modulation image based on the at least one flat-field response contour;
generating a demodulation image from the modulation image;
receiving light-field image data;
applying the generated demodulation image to the received light-field image data to generate a demodulated light-field image; and
causing a display device to output the light-field demodulated image.

22. The computer program product of claim 21, wherein the computer program code configured to cause at least one processor to generate a modulation image comprises computer program code configured to cause at least one processor to generate a plurality of modulation images, each modulation image being associated with a set of parameters of the light-field image capture device.

23. The computer program product of claim 21, wherein the modulation image comprises a plurality of pixels having values, and wherein the computer program code configured to cause at least one processor to generate a demodulation image from the modulation image comprises computer program code configured to cause at least one processor to determine a reciprocal of each pixel value.

24. The computer program product of claim 21, wherein the demodulated light-field image comprises a plurality of pixels, each pixel being associated with a plurality of values, each value corresponding to a different spectral range, the computer program product further comprising computer program code configured to cause at least one processor to apply a demosaicing operation to the demodulated light-field image.

25. The computer program product of claim 21, further comprising computer program code configured to cause at least one processor to perform the steps of:
estimating a scene illumination color; and
adjusting pixel values based on the estimated scene illumination color.

26. The computer program product of claim 21, further comprising computer program code configured to cause at least one processor to perform the steps of:
estimating a scene illumination color; and
for each pixel:
determining a probability that the pixel is saturated; and
steering a chrominance value for the pixel toward the estimated scene illumination color, wherein the steering is performed to an extent proportional to the determined probability.

27. The computer program product of claim 21, wherein the demodulated light-field image comprises a plurality of pixels, each pixel being associated with a plurality of values, each value corresponding to a different spectral range, and wherein the computer program product further comprises computer program code configured to cause at least one processor to convert the demodulated light-field image to chrominance and luminance data.

28. The computer program product of claim 21, further comprising computer program code configured to cause at least one processor to, prior to causing a display device to output the light-field demodulated image, apply an automatic white-balance correction algorithm to the demodulated light-field image.

29. A system for compensating for sensor saturation and microlens modulation in a light-field image capture device having a plurality of microlenses, comprising:
  circuitry configured to perform the steps of:
    determining a flat-field response contour for each of at least one region of an image sensor;
    generating a modulation image based on the at least one flat-field response contour;
    generating a demodulation image from the modulation image;
    receiving light-field image data; and
    applying the generated demodulation image to the received light-field image data to generate a demodulated light-field image; and
  a display device, communicatively coupled to the circuitry, configured to output the light-field demodulated image.

30. The system of claim 29, wherein the circuitry configured to generate a modulation image comprises circuitry configured to generate a plurality of modulation images, each modulation image being associated with a set of parameters of the light-field image capture device.

31. The system of claim 29, wherein the modulation image comprises a plurality of pixels having values, and wherein the circuitry configured to generate a demodulation image from the modulation image comprises circuitry configured to determine a reciprocal of each pixel value.

32. The system of claim 29, wherein the demodulated light-field image comprises a plurality of pixels, each pixel being associated with a plurality of values, each value corresponding to a different spectral range, the system further comprising circuitry configured to apply a demosaicing operation to the demodulated light-field image.

33. The system of claim 29, further comprising circuitry configured to perform the steps of:
  estimating a scene illumination color; and
  adjusting pixel values based on the estimated scene illumination color.

34. The system of claim 29, further comprising circuitry configured to perform the steps of:
  estimating a scene illumination color; and
  for each pixel:
    determining a probability that the pixel is saturated; and
    steering a chrominance value for the pixel toward the estimated scene illumination color, wherein the steering is performed to an extent proportional to the determined probability.

35. The system of claim 29, wherein the demodulated light-field image comprises a plurality of pixels, each pixel being associated with a plurality of values, each value corresponding to a different spectral range, and wherein the system further comprises circuitry configured to convert the demodulated light-field image to chrominance and luminance data.

36. The system of claim 29, further comprising circuitry configured to, prior to causing a display device to output the light-field demodulated image, apply an automatic white-balance correction algorithm to the demodulated light-field image.

* * * * *